United States Patent
Yu et al.

(10) Patent No.: US 10,003,409 B2
(45) Date of Patent: Jun. 19, 2018

(54) IMAGING CANCELLATION IN HIGH-SPEED INTENSITY MODULATION AND DIRECT DETECTION SYSTEM WITH DUAL SINGLE SIDEBAND MODULATION

(71) Applicant: ZTE Corporation, Shenzhen (CN)

(72) Inventors: Jianjun Yu, Basking Ridge, NJ (US); Yuanquan Wang, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days. days.

(21) Appl. No.: 15/416,879

(22) Filed: Jan. 26, 2017

(65) Prior Publication Data

US 2017/0214485 A1     Jul. 27, 2017

Related U.S. Application Data

(60) Provisional application No. 62/287,794, filed on Jan. 27, 2016.

(51) Int. Cl.
*H04B 10/61* (2013.01)
*H04J 14/02* (2006.01)
*H04B 7/0413* (2017.01)

(52) U.S. Cl.
CPC ......... *H04B 10/616* (2013.01); *H04B 7/0413* (2013.01); *H04J 14/0298* (2013.01)

(58) Field of Classification Search
CPC ...................................... H04B 10/60–10/6973
See application file for complete search history.

(56) References Cited

U.S. PATENT DOCUMENTS

| | | | |
|---|---|---|---|
| 7,266,310 B1 | 9/2007 | Savory et al. | |
| 2004/0156644 A1* | 8/2004 | Yasue | H04B 10/5057 398/198 |
| 2009/0274462 A1* | 11/2009 | Yu | H04B 10/2587 398/68 |
| 2009/0279825 A1* | 11/2009 | Kawanishi | G02F 1/225 385/2 |
| 2011/0002689 A1 | 1/2011 | Sane et al. | |
| 2012/0177368 A1 | 7/2012 | Aoki | |

(Continued)

OTHER PUBLICATIONS

Chien, H.-C., et al., "Optical independent-sideband modulation for bandwidth-economic coherent transmission," Optics Express, 22(8): 9465-9470, Apr. 2014.

(Continued)

*Primary Examiner* — David Payne
*Assistant Examiner* — Casey Kretzer
(74) *Attorney, Agent, or Firm* — Perkins Coie LLP

(57) ABSTRACT

Provided are methods and systems for receiving and processing optical signals are provided. A dual single side band (SSB) modulation scheme is utilized to take advantage of given wavelengths' bandwidth. Modulation schemes are employed that modulate each SSB with their In-phase (I) and Quadrature (Q) components. The methods and systems discussed perform MIMO de-multiplexing algorithms to remove any imaging components of the left and right SSBs provided by the modulators. Various algorithms can be employed, including but not limited to inserting time interleaved training sequences into the channels of the right and left SSB signals or by employing a constant-modulus-algorithm (CMA) de-multiplexing.

22 Claims, 25 Drawing Sheets

(56) References Cited

U.S. PATENT DOCUMENTS

| | | | |
|---|---|---|---|
| 2012/0269297 A1* | 10/2012 | Mishra | H04L 27/0014 |
| | | | 375/326 |
| 2013/0259174 A1* | 10/2013 | Qian | H04L 7/0079 |
| | | | 375/346 |
| 2013/0272719 A1 | 10/2013 | Yan et al. | |
| 2014/0105616 A1 | 4/2014 | Yan et al. | |
| 2014/0270765 A1* | 9/2014 | Cole | H04B 10/27 |
| | | | 398/48 |
| 2015/0155948 A1* | 6/2015 | Chen | H04B 10/5165 |
| | | | 398/188 |
| 2017/0250760 A1 | 8/2017 | Yu et al. | |

OTHER PUBLICATIONS

Li, X., et al., "Antenna Polarization Diversity for 146Gb/s Polarization Multiplexing QPSK Wireless Signal Delivery at W-band," Optical Fiber Communications Conference and Exhibition (OFC), OSA Technical Digest (online) (Optical Society of America, 2014), Paper M3D.7, 3 pages, Mar. 2014.

Wang, Y., et al., "Demonstration of High-Speed 2×2 Non-Imaging MIMO Nyquist Single Carrier Visible Light Communication With Frequency Domain Equalization," Journal of Lightwave Technology, 32(11):2087-2093, Jun. 2014.

Zhang, L., et al., "Transmission of 112-Gb/s+ DMT over 80-km SMF Enabled by Twin-SSB Technique at 1550nm," 2015 European Conference on Optical Communication (ECOC), Paper We4.6.4, 3 pages, Sep. 2015.

\* cited by examiner

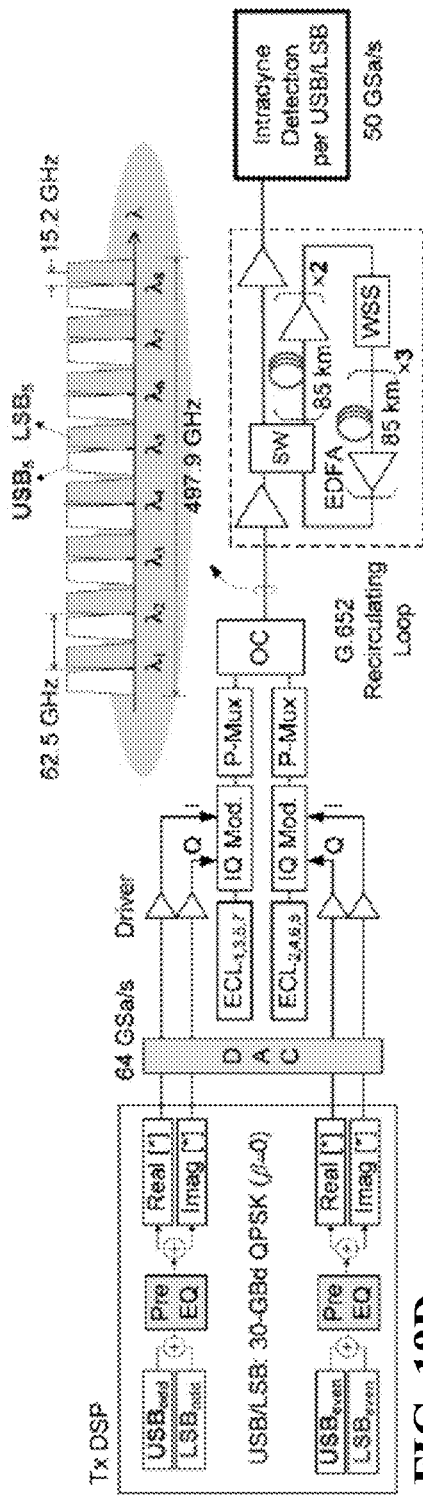
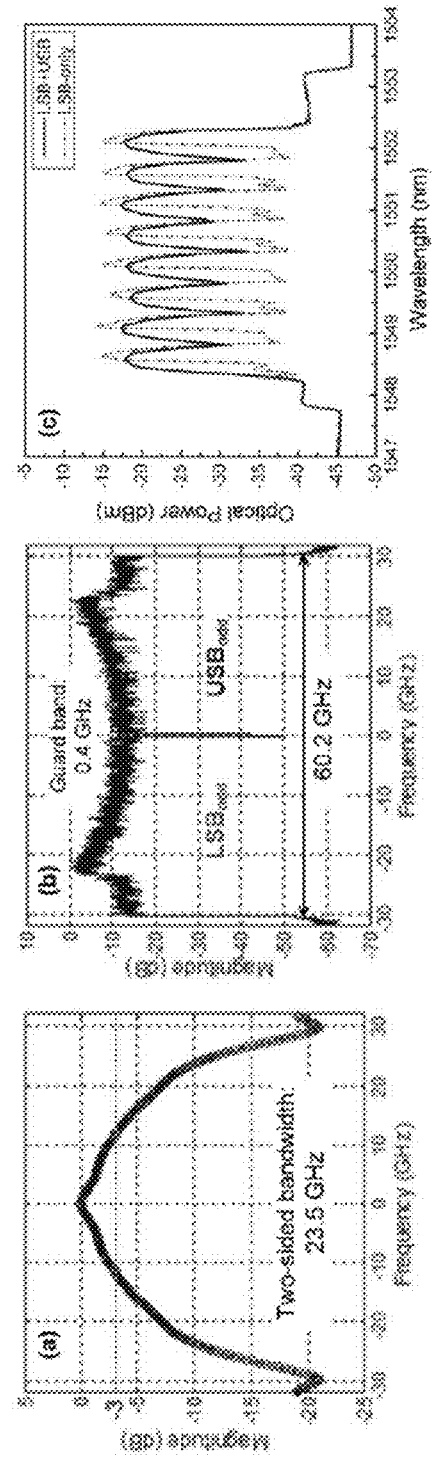
FIG. 19A  FIG. 19B  FIG. 19C  FIG. 19D

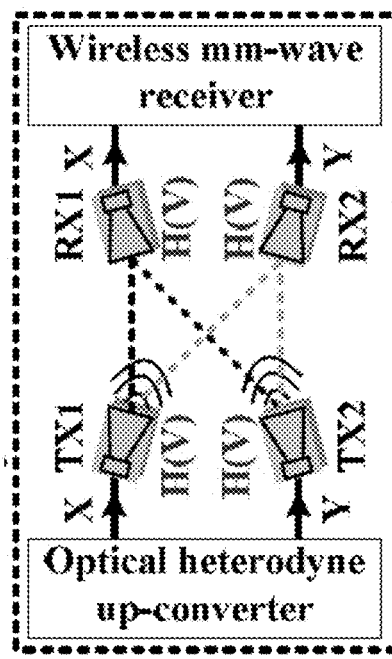
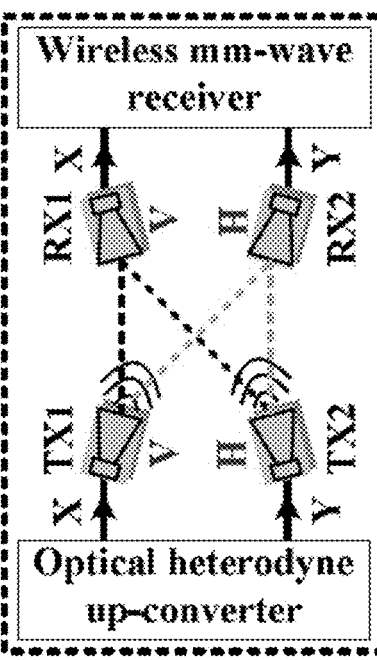
FIG. 22A
FIG. 22B

US 10,003,409 B2

IMAGING CANCELLATION IN HIGH-SPEED INTENSITY MODULATION AND DIRECT DETECTION SYSTEM WITH DUAL SINGLE SIDEBAND MODULATION

CROSS REFERENCE TO RELATED APPLICATIONS

This patent document claims the benefit of priority of U.S. Provisional Patent Application No. 62/287,794, filed on Jan. 27, 2016. The entire content of the before-mentioned patent application is incorporated by reference as part of the disclosure of this document.

BACKGROUND

The wide-spread adoption of multimedia services, broadband internet, and cloud services, among others, have driven the demand of high transmission capacity of optical systems such as short-reach links, access, and metro networks. Typically, it requires optical transmission systems with high data rates (e.g., up to 1 Tb/s and beyond). To meet the ever increasing demands, access and metro networks are moving from the classic spectral inefficient single channel non-return to zero (NRZ) modulation to spectral efficient advance modulation formats such as wavelength-division multiplexing (WDM). The spectral efficient modulation formats, however, provide many distortions in their communication channels when used in optical systems.

SUMMARY

The present document relates to optical communication systems. In particular, the present document relates to systems and methods for improving the efficiency of data transfer in optical systems through digitally processing signals that were received optically via a dual single side band (SSB) modulation technique.

In one example aspect, an optical signal is generated by a laser diode and modulated with data with an IQ Modulator or a Dual Drive Mach-Zehnder Modulator (DD-MZM). These modulators modulate the optical signal by varying its In-phase and Quadrature components to generate a dual SSB signal. At a receiver, the dual SSB signal is received in the optical domain and converted into the digital electrical domain, where it is then Multiple-Input Multiple-Output (MIMO) de-multiplexed to remove imaging components of the dual SSB's left and right SSB that were created by the modulator. In an example aspect, a receiver in an optical network, comprises a first optical band-pass filter and a second optical band-pass filter configured to receive a dual single side band (SSB) modulated optical signal on a transmission fiber, wherein the dual SSB modulated optical signal includes a left SSB modulated optical signal and a right SSB modulated optical signal, the first optical band-pass filter configured to band-pass filter the dual SSB optical signal to obtain the left SSB modulated optical signal, and the second optical band-pass filter configured to band-pass filter the dual SSB optical signal to obtain the right SSB modulated optical signal; a first photodiode configured to convert the left SSB modulated optical signal to a left SSB modulated electrical signal; a second photodiode configured to convert the right SSB modulated optical signal to a right SSB modulated electrical signal; and a processor configured to de-multiplex the left and the right SSB modulated electrical signal to remove imaging using a Multiple-Input Multiple-Output (MIMO) algorithm.

In yet another aspect, the MIMO de-multiplexing algorithm further inserts time interleaved training sequences into the channels of the right and left SSB signals to remove their respective imaging components if discrete multi-tone modulation (DMT) or orthogonal frequency division multiplexing (OFDM) modulation format is adopted for each of the dual SSB signals.

In yet another aspect, a constant-modulus-algorithm (CMA) is used for de-multiplexing to remove a dual SSB's imaging components in the case that the modulation is performed on a single carrier modulation format. By adopting imaging cancellation in an optical system with MIMO de-multiplexing, the performance of a IM/DD system based on modulators that create imaging components can be improved.

In yet another aspect, a method, implemented at a receiver in an optical network, comprises receiving a dual single side band (SSB) modulated optical signal on a transmission fiber, wherein the dual SSB modulated optical signal includes a left SSB modulated optical signal and a right SSB modulated optical signal; band-pass filtering the dual SSB modulated optical signal with optical filters to obtain a left single side band (SSB) modulated optical signal and a right single side band (SSB) modulated optical signal; converting the left SSB modulated optical signal to a left SSB modulated electrical signal, and the right SSB modulated optical signal to a right SSB modulated electrical signal; and de-multiplexing the left and the right SSB modulated electrical signals to remove imaging using a Multiple-Input Multiple-Output (MIMO) algorithm. In some example aspects, the receiving of a dual single side band (SSB) modulated optical signal sent using a transmission fiber can be performed at the input of the band-pass filter. In some embodiments, the dual SSB modulated optical signal is modulated with orthogonal frequency division multiplexing (OFDM). In some embodiments, the MIMO algorithm further comprises inserting time interleaved training sequences into channels of the right SSB and the left SSB of the dual SSB signal. In some embodiments, the dual SSB modulated optical signal is modulated with discrete multi-tone modulation (DMT). In some embodiments, the MIMO algorithm further comprises inserting time interleaved training sequences into the channels of the right SSB and the left SSB of the dual SSB signal. In some embodiments, the dual SSB modulated optical signal is modulated with a single carrier modulation format and the MIMO algorithm further comprises constant-modulus-algorithm (CMA) de-multiplexing. In some embodiments, the dual SSB signal is modulated with a Dual Drive Mach-Zehnder Modulator. In some embodiments, the dual SSB signal is modulated with wavelength-division multiplexing (WDM). In some embodiments, the dual SSB signal is modulated with carrier-less amplitude phase modulation (CAP). In some embodiments, the dual SSB signal is modulated with quadrature amplitude modulation (QAM).

In yet another aspect, a receiver in an optical network, comprises a photodiode configured to receive a dual SSB modulated optical signal on a transmission fiber, an optical band-pass filter configured to band-pass filter the dual SSB optical signal, and a processor configured to de-multiplex the band-pass filtered optical signals to remove imaging using a MIMO algorithm. In one embodiment, the dual SSB modulated optical signal is modulated with OFDM. In another embodiment, time interleaved training sequences into the channels of the right SSB and the left SSB of the dual SSB signal to removing imaging. In another embodiment, the dual SSB modulated optical signal is modulated with DMT modulation. In another embodiment, the dual SSB modulated optical signal is modulated with a single carrier modulation format and the MIMO algorithm further comprises constant-modulus-algorithm (CMA) de-multiplexing. In another embodiment, the receiver utilizes a DD-MZM to modulate a dual SSB signal. In another embodiment, the dual SSB signal is modulated with WDM. In another embodiment, the dual SSB signal is modulated with carrier-less amplitude phase modulation (CAP). In another embodiment, the dual SSB signal is modulated with QAM.

These and other aspects, and example implementations and variations are set forth in the drawings, the description and the claims.

BRIEF DESCRIPTION OF THE DRAWINGS

FIG. 19A illustrates the −3 dB two-sided bandwidth of the overall frequency response when connecting Tx and Rx in back to back is around 23.5 GHz for delivering two 30 GBd signals.

FIG. 19B illustrates the combined RF spectrum of both LSBodd and USBodd with pre-equalization in the digital domain FIG. 19C illustrates the optical spectra of the generated WDM O-ISB signals (0.02 nm resolution) with and without the USB channels.

FIG. 19D illustrates Experimental setup for bandwidth-economic O-ISB transmission delivering 8 wavelengths, each carrying one 30-GBd LSB and one 30-GBd USB with PM-QPSK modulation.

FIGS. 22A and 22B illustrates the schematic diagram of the 2×2 MIMO wireless links based on one single antenna polarization and antenna polarization diversity, respectively.

DETAILED DESCRIPTION

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively or in addition, data modulation can also be achieved in the optical domain.

Intensity modulation and direct detection (IM/DD) and wavelength-division multiplexing (WDM) are provided as alternatives to non-return to zero (NRZ) modulation due to their low cost, power consumption, and complexity. IM/DD and WDM are competitive candidates for next generation passive optical networks.

Systems of the disclosure can utilize various modulation techniques such as wavelength-division multiplexing (WDM), intensity modulation and direct detection (IM/DD), discrete multitoned modulation (DMT), orthogonal frequency-division multiplexing (OFDM), carrier-less amplitude phase modulation (CAP), and quadrature amplitude modulation (QAM). Various techniques such as single sideband (SSB), dual SSB, and vestigial sideband (VSB) can also be utilized.

Figure 1:
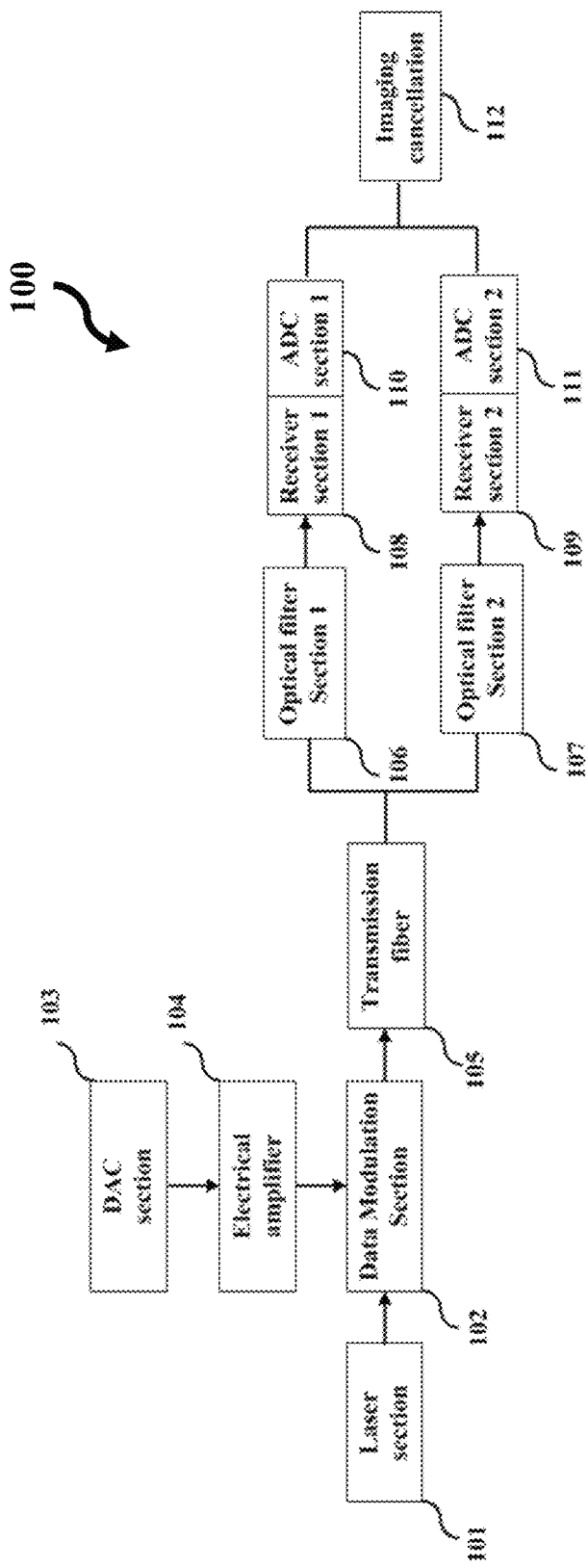
FIG. 1 shows an example block diagram of a system to transmit and receive signals.

FIG. 1 shows an example block diagram of an Optical Communication System 100 used to generate and receive optical signals. At the transmitter side, Laser Section 101 generates an optical signal. The Laser Section 101 can be used to generate optical signals at one or many different wavelengths. The optical signal from Laser Section 101 is coupled to the Data Modulation Section 102 which modulates the optical signal supplied from the Laser Section 101.

A Digital to Analog Section 103 receives digital data that is modulated onto the carrier signal for transmission over the Optical Transmission Fiber 105. The Digital to Analog Section 103 converts an inputted digital signal into an analog signal. The analog signal may be amplified and conditioned (e.g., low pass filtered) through an Electrical Amplifier 104. The output of the Electrical Amplifier 104 is used by the Data Modulation Section 102 to modulate the optical carrier from the Laser Section 101. The signal from the Data Modulation Section 102 is transmitted on the Optical Transmission Fiber 105. The signal transmitted on the Optical Transmission Fiber 105 may go through intermediate optical equipment such as amplifiers, repeaters, switches, etc., which are not shown.

At the receiver side, the modulated optical signal is received and processed at two separate filters, Optical Filter Section 1 106 and Optical Filter Section 2 107. Optical Filter Section 1 106 and Optical Filter Section 2 107 can be made of standard optical filters that filter out signals of undesired wavelengths. After the optical signals are filtered from Optical Filter Section 1 106 and Optical Filter Section 2 107, the signals are inputted into Receiver Section 1 108 and Receiver Section 2 109, respectively. Receiver Section 1 108 and Receiver Section 2 109 convert the optical signals into electrical signals and transmit the electrical signals to the Analog to Digital Convertor Section 1 110 and Analog to Digital Convertor Section 2, respectively, where the signals are converted from analog to digital. The digital signals are then provided to an Imaging Cancellation Section 112 which is used to remove imaging that is induced by the Data Modulation Section 102.

FIGS. 2-13 illustrate expanded examples of components, signals, and outputs of the block diagram of FIG. 1 and provide further detail regarding example embodiments. The components and techniques are only illustrative. It is considered that any known system for the transmission and modulation of optical signals can be utilized.

Figure 2:
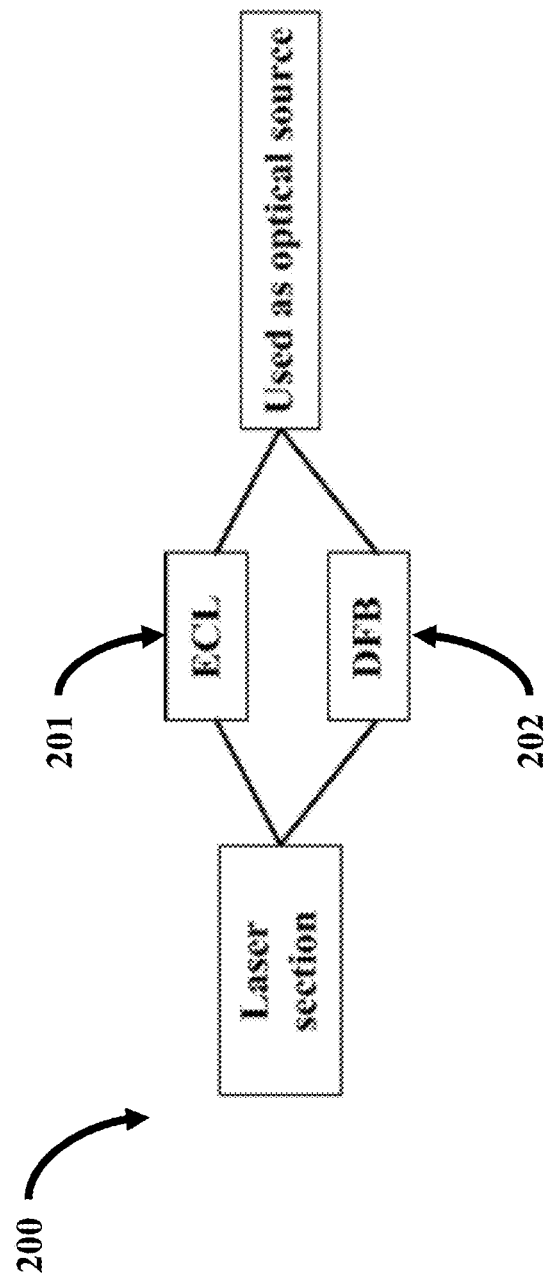
FIG. 2 shows an example diagram of optical sources for a laser section.

FIG. 2 is an example block diagram of various optical sources that can be used for the Laser Section 101. In some embodiments, Laser Section 101 may use an External Cavity Laser (ECL) 201. Some embodiments of Laser Section 101 may use a Distributed Feedback Laser (DF) 202. The examples of optical sources for Laser Section 101 are only illustrative and any optical source known in the art to generate optical signals can be used.

Figure 3:
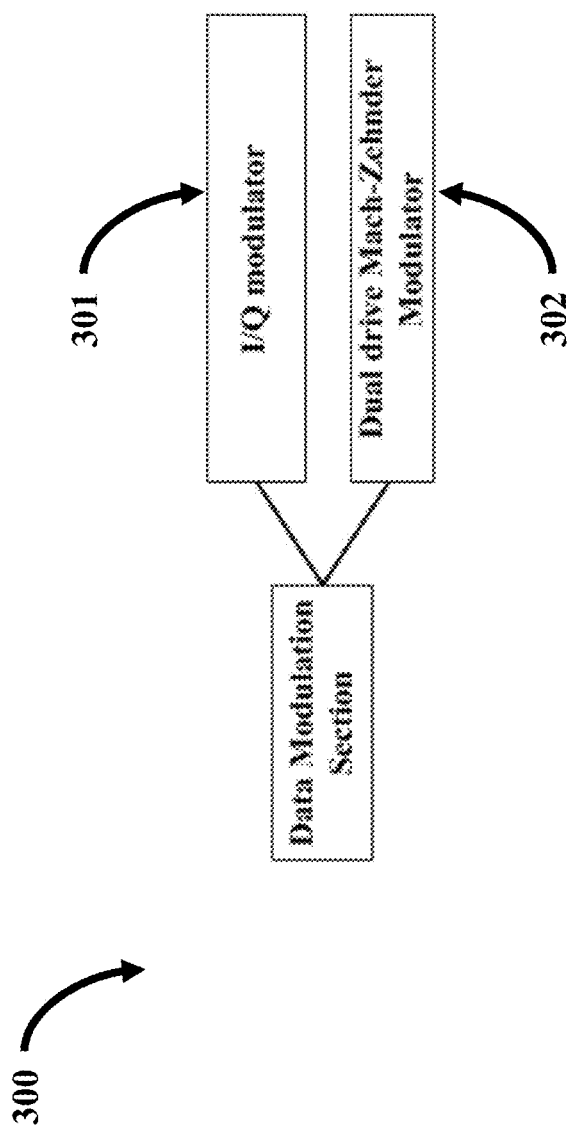
FIG. 3 shows an example diagram of modulators for the data modulation section.

FIG. 3 is an example block diagram of various modulators that can be utilized by the Data Modulation Section 102. In some embodiments, an IQ Modulator 301 can be used to modulate optical signals. In some embodiments, a Dual Drive Mach-Zehnder Modulator (DD-MZM) 302 can be utilized to modulate optical signals. The IQ Modulator 301 and the DD-MZM 302 can use an In-phase and Quadrature component, 90 degrees out of phase, to modulate an optical signal. Both the IQ Modulator 301 and the DD-MZM Modulator 302 can be configured to provide dual single side band (SSB) modulation, where both side bands of any given wavelength can be used to transmit data.

Figure 4:
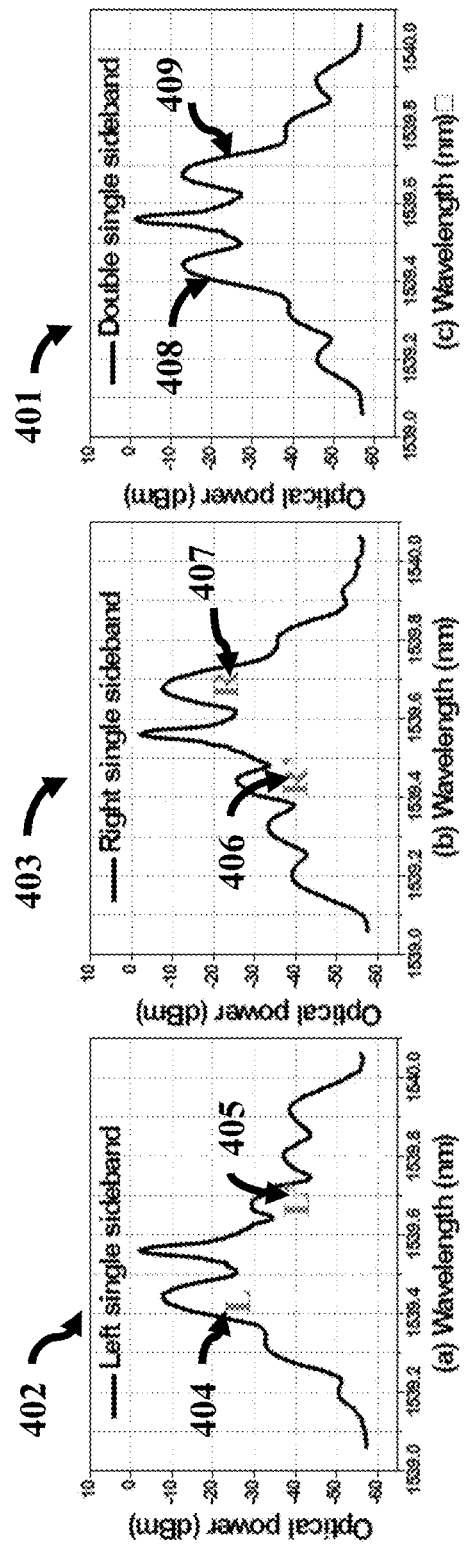
FIG. 4 shows example spectra outputs of a double single sideband that includes a left single side band and a right single side band and their imaging components.

FIG. 4 is an example diagram of a Dual SSB Signal 401 provided from the Data Modulation Section 102. The Dual SSB Signal 401 is centered around a wavelength of approximately 1539.55 nm. The wavelengths described are only illustrative and any wavelength or channel can be used. The Dual SSB Signal 401 is composed of two components—a Left SSB Signal 402 and a Right SSB Signal 403. The Left SSB Signal 402 is made of both a Left SSB Component L 404 and a Left SSB Imaging Component L' 405. Similarly, the Right SSB Signal 403 is made of both a Right SSB Component R 406 and a Right SSB Imaging Component R' 407. The Dual SSB Signal 401 is the combined signal of the Left SSB Signal 402 and the Right SSB Signal 403, with both of their SSB components (Left SSB Component L 404 and Right SSB Component R 406) and imaging components (Left SSB Imaging Component L' 405 and Right SSB Imaging Component R' 407). The Left SSB 408 of the Dual SSB Signal 401 is the Left SSB Component L 404 and the Right SSB Imaging Component R' 407. The Right SSB 409 of the Dual SSB Signal 401 is the Right SSB Component R 407 and the Left SSB Imaging Component L' 405.

As a mathematical example, a Left SSB Signal can be expressed as:

$$E_l(t)=A(t)\exp(j\varphi_l(t))\exp(-jw_l t). \quad \text{Eq. (1)}$$

A Right SSB Signal can be expressed as:

$$E_r(t)=B(t)\exp(j\varphi_r(t))\exp(jw_r t). \quad \text{Eq. (2)}$$

A(t) and B(t) are the amplitude of the left and right side band, respectively. $\varphi_l$ and $\varphi_r$ are the phases of the left and right sideband, respectively. A Dual SSB Signal can be expressed as:

$$E(t)=E_l(t)+E_r(t). \quad \text{Eq. (3)}$$

In some embodiments, the spectra of the left SSB 401 and right SSB 402 are non-overlapping. In some embodiments, the left SSB 401 can be anywhere from a given wavelength, from $W_0$ to W, and the right SSB 402 can be anywhere from a given wavelength W to $W_1$.

Figure 5:
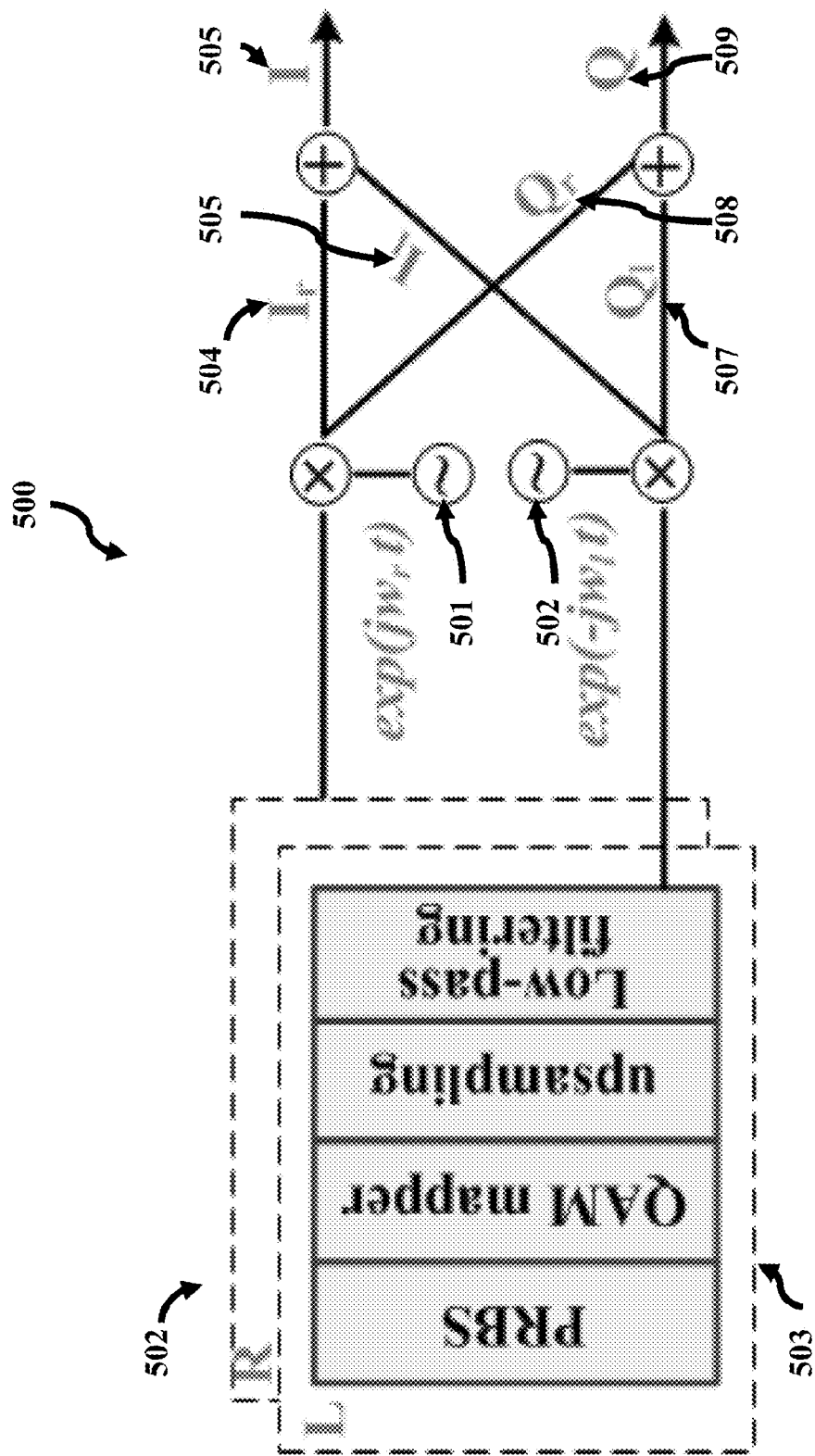
FIG. 5 shows an example diagram of a digital signal processor architecture to generate in-phase and quadrature signals to generate a dual SSB signal.
Figure 6:
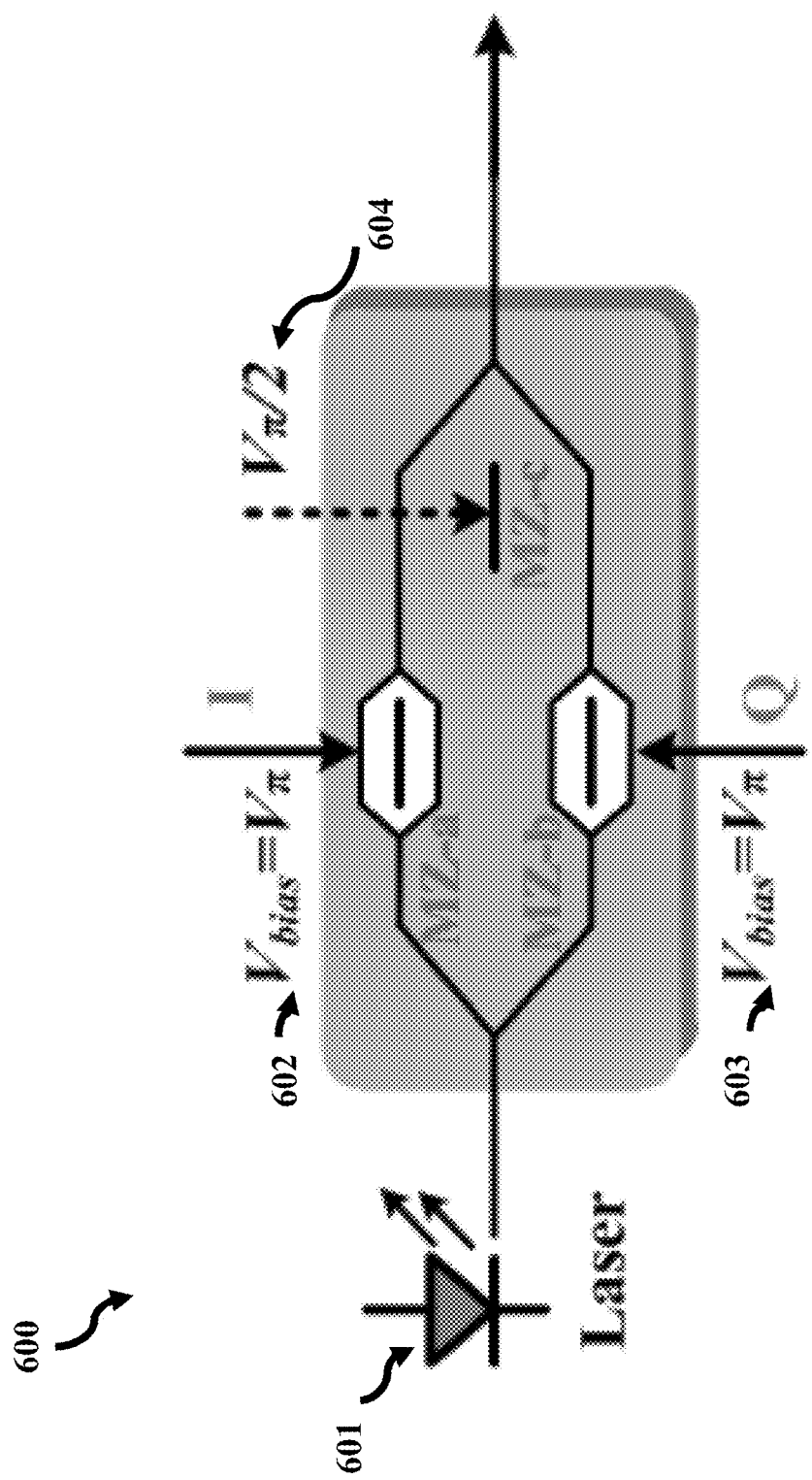
FIG. 6 shows an example Dual Drive Mach-Zehnder Modulator.

FIGS. 5-6 provide illustrative examples of modulators that can be utilized to simultaneously generate two wavelength channels by the same modulator. FIGS. 5-6 are only illustrative and other modulation techniques for the generation of dual-SSB modulation techniques can be utilized.

FIG. 5 is an example block diagram of an Architecture 500 that is used to generate a Dual SSB Signal modulating with an In-Phase component (I) and a Quadrature component (Q). In some embodiments, the architecture 500 may be implemented in a DSP. A Carrier Signal for the Right SSB Signal 501 and a Carrier Signal for the Left SSB 502 is multiplied with the data signal from the Right SSB IQ Modulator 502 and Left SSB IQ Modulator 503. As illustrated, to generate the output Q and I components, the DSP Architecture 500 performs PRBS, QAM, up-samples, and low-pass filters the signal. These techniques are only illustrative and other intensity modulation formats can be utilized and any known signal conditioning techniques may be utilized. It is understood that any number of symbols can be generated by the QAM mapper.

In phase components $I_r$ 504 and $I_l$ 505 from the Right SSB IQ Modulator 502 and Left SSB IQ Modulator 503, respectively, are added to create an in-phase component I 506 and Quadrature components $Q_r$ 507 and $Q_l$ 508 are added to create a Quadrature component 509.

FIG. 6 is an example diagram of a DD-MZM 600. A Laser Input 601 is received and the DD-MZM 600 inputs MZ-a 602 and MZ-b 603 are biased at the minimum points to realize optical carrier suppression modulation. MZ-c 604 is biased at the orthogonal point to maintain a $\pi/2$ phase shift between the two different arms of the modulator.

FIGS. 5-6 are only illustrative. Any known algorithms to perform dual SSB modulation can be utilized. In some embodiments, dual-SSB modulation can be accomplished by the methods described in the section below titled "Optical Independent-Sideband Modulation for Bandwidth-Economic Coherent Transmission."

The Left SSB Imaging Component L' 405 and Right SSB Imaging Component R' 407, as shown in FIG. 4, are induced by the imbalance of I (in-phase) and Q (quadrature) branches of modulators such as those show in FIGS. 5-6 and imperfect characteristics of optical and electrical devices.

Figure 7:
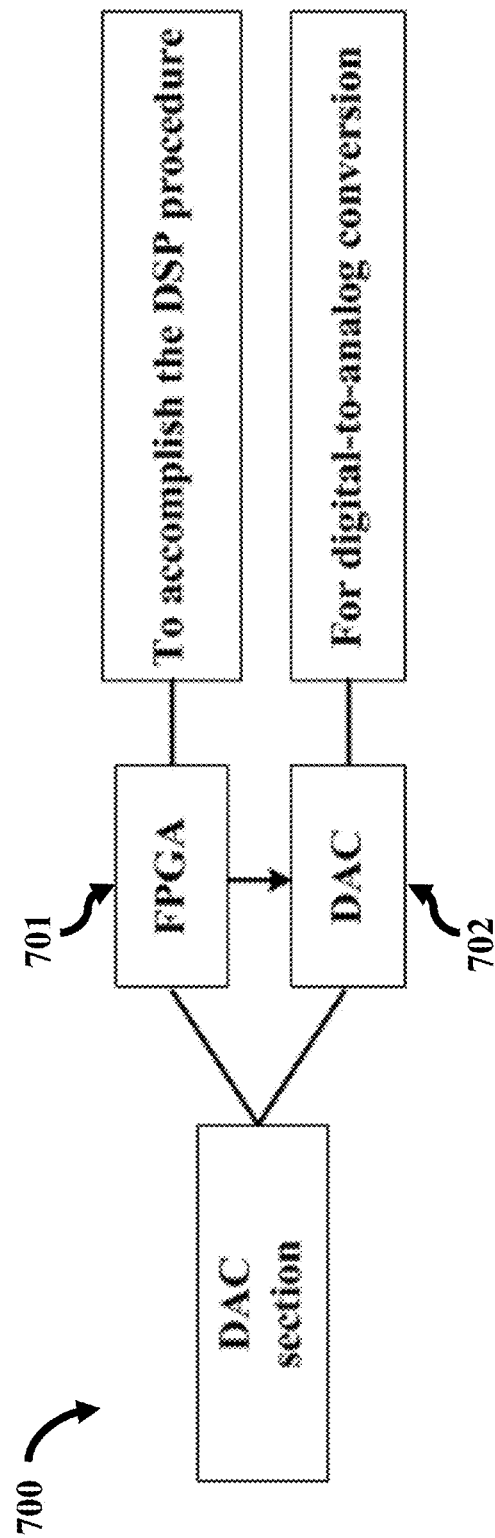
FIG. 7 shows an example diagram of a digital to analog section used to convert digital singles to analog signals.

FIG. 7 shows an example block diagram of a Digital to Analog Section 700. An ASIC (application specific integrated controller), such as an FPGA (field programmable gate array) 701 is provided to provide digital signal processing capabilities. The FPGA 700 is only illustrative and any combination of logic gates, general purpose processors, or digital signal processors can be used. The FPGA 701 is used to operate the Digital to Analog Converter 702.

Figure 8:
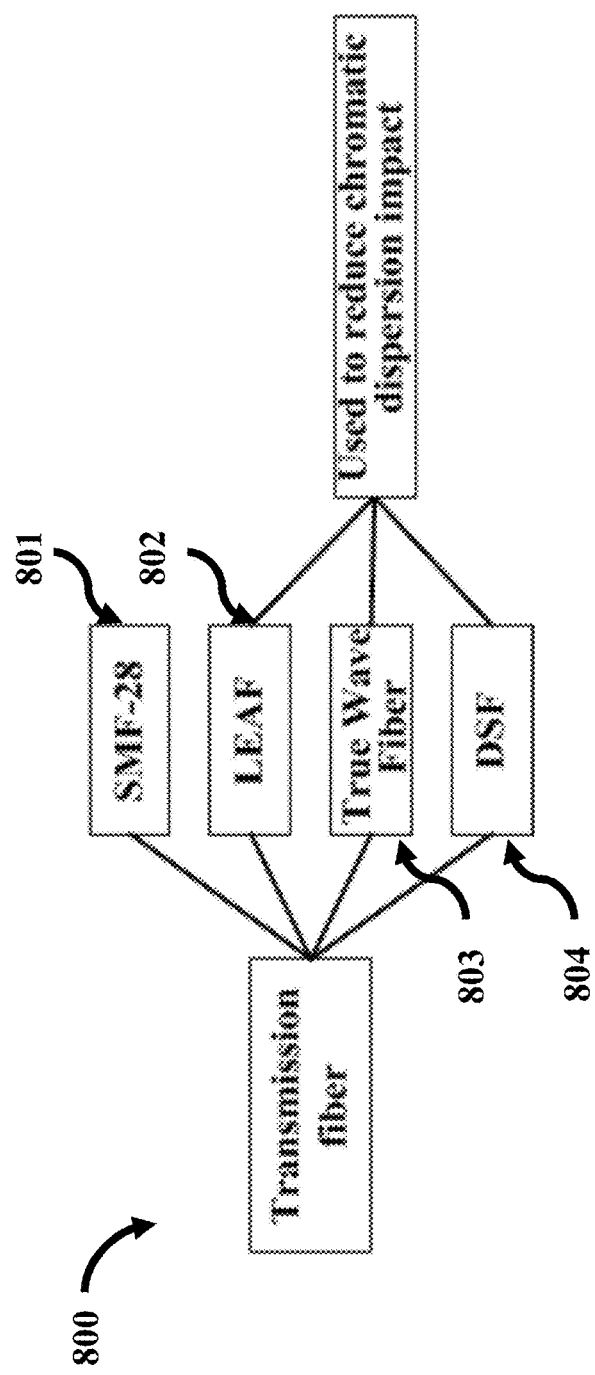
FIG. 8 shows an example diagram of transmission fibers used to transmit optical signals.

FIG. 8 illustrates an example block diagram of Transmission Fiber 800 that can be utilized for transmitting the dual SSB signal. For example, the Transmission Fiber 800 can be SMF-28 801 (single mode optical fiber), LEAF 802 (from Corning), True Wave Fiber 803, or DSF 804 (dispersion shifted fiber). LEAF 802, True Wave Fiber 803, and DSF 804 can be used to reduce chromatic dispersion impact. The types of Transmission Fiber 800 shown are only illustrative and any fiber optic cable can be utilized.

Figure 9:
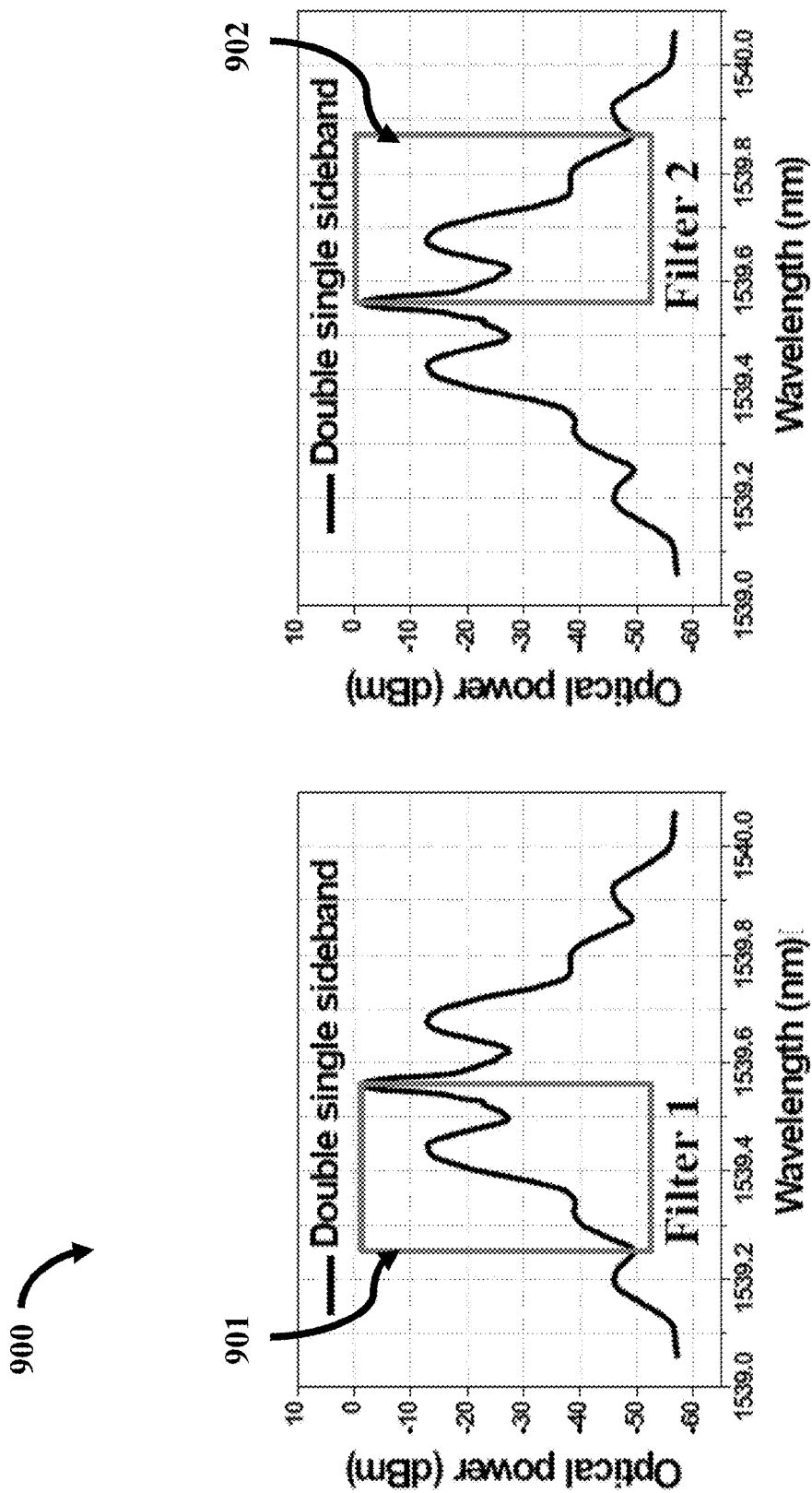
FIG. 9 shows example spectra output of a double single sideband single where certain wavelengths of the signal are band-pass filtered.

FIG. 9 illustrates an example diagram of an example Dual SSB Signal 900 transmitted by Transmission Fiber 105 and received by Optical Filter Section 1 106 and Optical Filter Section 2 107 of FIG. 1. The left SSB is filtered as shown in Filter 1 901. The right SSB is filtered as shown in Filter 2 902. Band-pass optical filters can be employed to filter out either sidebands. Here, an interleave filter with a 50 Ghz grid is used. The 3-dB, 10-dB, and 20 dB bandwidth of the interleave filter is 42.5 GHz, 54 GHz, and 62.1 GHz, respectively. The filtered single side band will have both the SSB component and the other side's imaging component.

Mathematically, the filtered left SSB signal can be expressed as:

$$E_l(t) = L + R' \quad \text{Eq. (4)}$$

The right SSB signal can be expressed as:

$$E_r(t) R + L'. \quad \text{Eq. (5)}$$

After down conversion to baseband and in the time domain, the imaging signal is the conjugate of the original signal where R'=conj(R) and L'=conj(L). Considering the coefficients, the filtered signals $E_l(t)$ and $E_r(t)$ can be written as:

$$\begin{bmatrix} E_l(t) \\ E_r(t) \end{bmatrix} = \begin{bmatrix} h_{11} L(t) + h_{12} conj(R(t)) \\ h_{21} conj(L(t)) + h_{22} R(t) \end{bmatrix} \quad \text{Eq. (6)}$$

Figure 10:
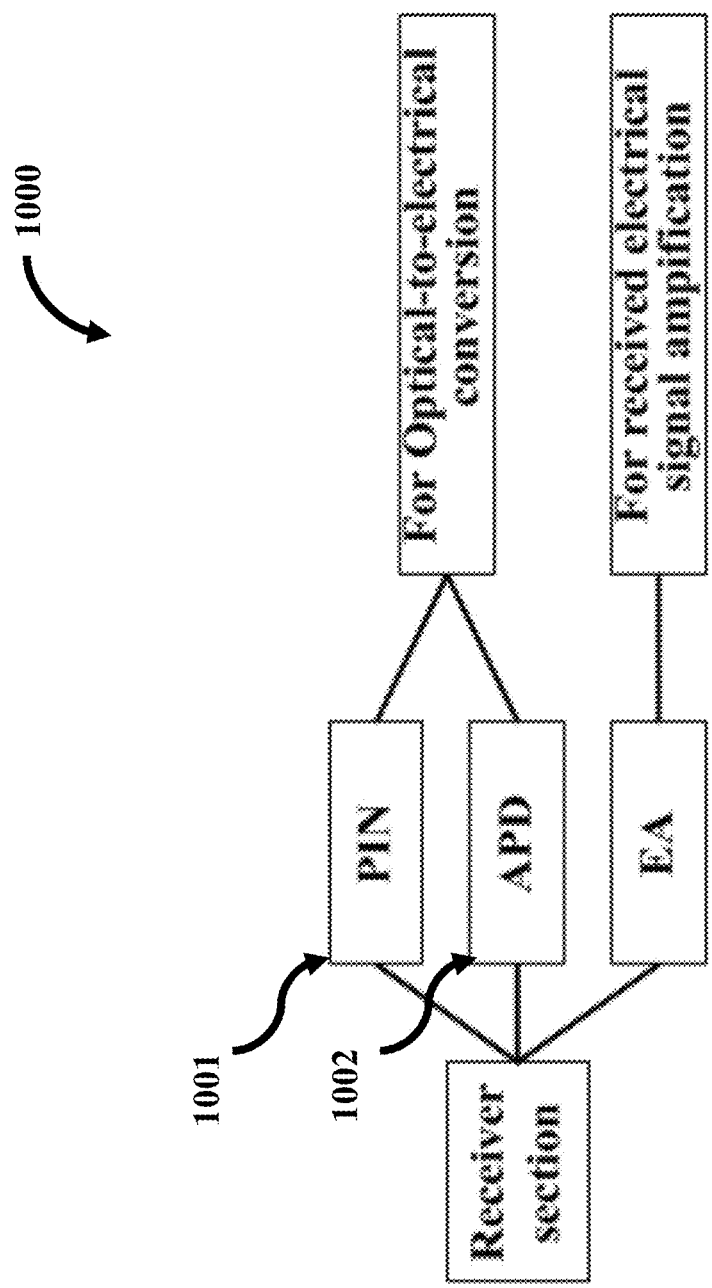
FIG. 10 shows an diagram of a receiver section.

FIG. 10 illustrates an example diagram of the Receiver Section 1000 that receives optical signals from the optical filters for either the right or left SSB. The Receiver Section 1000 can utilize a Positive-Intrinsic Negative Photodiode 1001 or an Avalanche Photodiode 1002 to receive and convert optical signals into electrical signals. The Positive-Intrinsic Negative Photodiode 1001 and Avalanche Photodiode 1002 are only illustrative and any optical to electrical converter can be used. The electric signal from the Positive-Intrinsic Negative Photodiode 1001 or Avalanche Photodiode 1002 can also be electrically amplified or conditioned.

Figure 11:
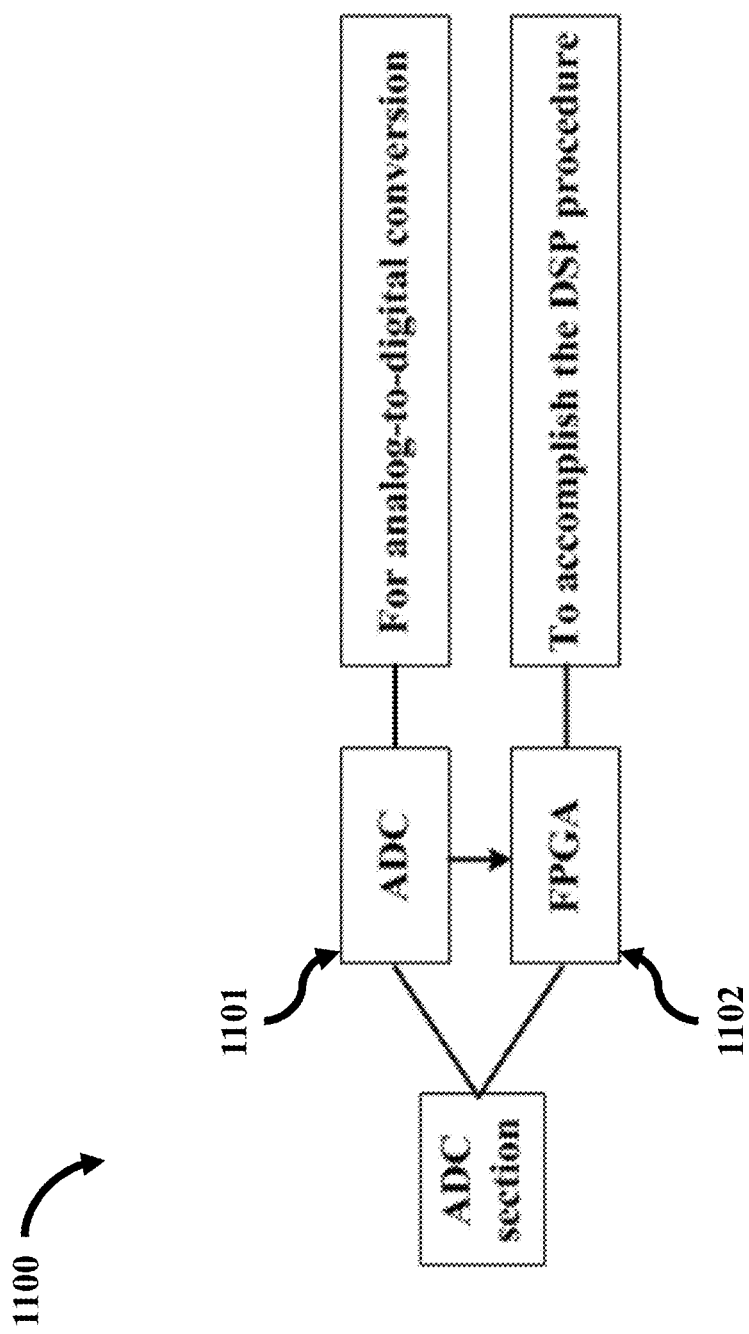
FIG. 11 shows an example diagram of the analog to digital section and example components that may be utilized.

FIG. 11 illustrates an example diagram of the Analog to Digital Section 1100 that can receive electrical signals for either the left or right SSBs from the Receiver Section 1000. The Analog to Digital Section 1100 has an Analog to Digital Converter 1101. An ASIC (application specific integrated controller), such as an FPGA (field programmable gate array) 1102 is provided to provide digital signal processing capabilities. The FPGA 1102 is only illustrative and any combination of logic gates, general purpose processors, or digital signal processors can be used. The FPGA 1102 is used to operate the Digital to Analog Converter 1101.

As illustrated in FIG. 1, the electrical signals from the Analog to Digital Converter Section 1 110 and Analog to Digital Converter Section 2 111 are inputted into an Imaging Cancellation Section 112. The Imaging Cancellation Section 112 can be performed by a digital signal processor, general purpose processor, a FPGA, or any ASIC.

Figure 12:
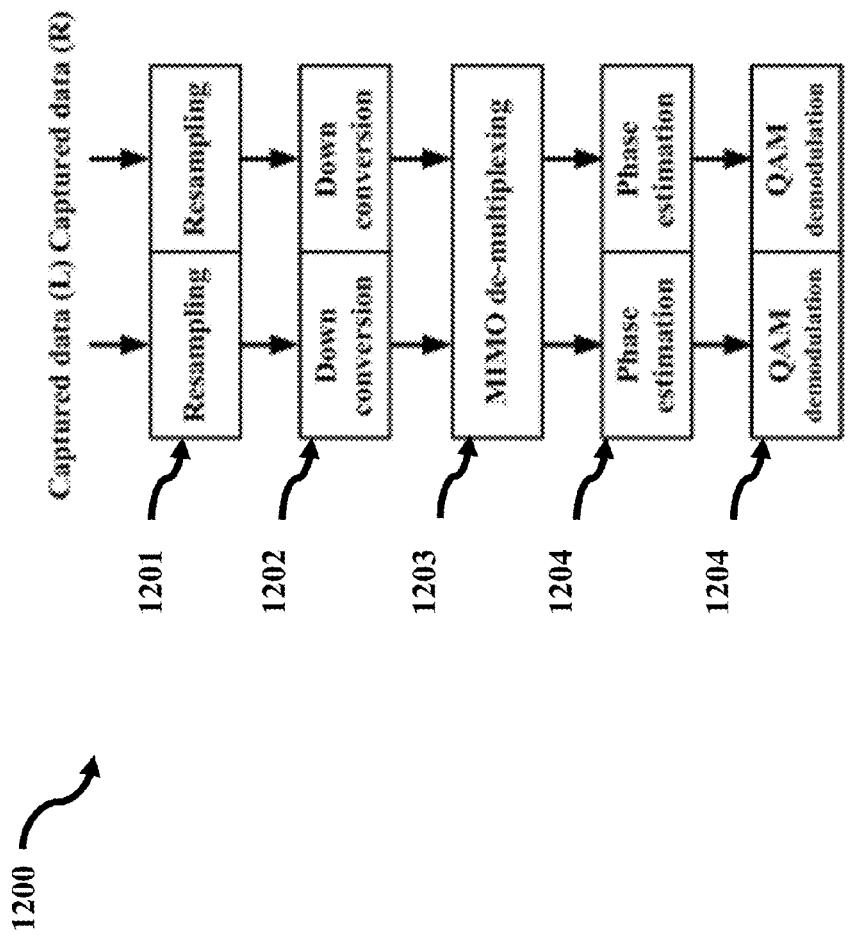
FIG. 12 shows an example flowchart that illustrates how signals are processed and how imaging components of the signals are removed.

FIG. 12 illustrates an example flowchart 1200 of imaging cancellation and data processing. Captured Data for both the left and right SSB obtained from analog to digital converters are Resampled 1201. The signals are then Down Converted 1202. The resulting signal is then Multiple-Input Multiple-Output (MIMO) de-multiplexed 1203 in either the time domain or the frequency domain. The MIMO de-multiplexing 1203 removes the imaging effect. In one embodiment, if DMT or OFDM is used in the system, imaging cancellation process can be accomplished by inserting time interleaved training sequences into the channels of the right and left SSB signals. In another embodiment, if a single carrier modulation format is used, CMA or CMMA de-multiplexing can be implemented. By adopting MIMO de-multiplexing algorithm at the frequency or time domain, the channel matrix of the signal can be estimated and the imaging component can be eliminated from the signal. After, a Phase Estimation Step 1204 is employed and the resulting signal is QAM Demodulated 1205 to determine data-points.

Various MIMO de-multiplexing algorithms can be utilized on a digital signal processor, general purpose processor, FPGA, or ASIC to remove the imaging components. In some embodiments, imaging effect cancellation can be achieved by the MIMO de-multiplexing algorithm described in the section below titled "Antenna Polarization Diversity for 146 Gb/s Polarization Multiplexing QPSK Wireless Signal Delivery at W-Band."

Figure 13:
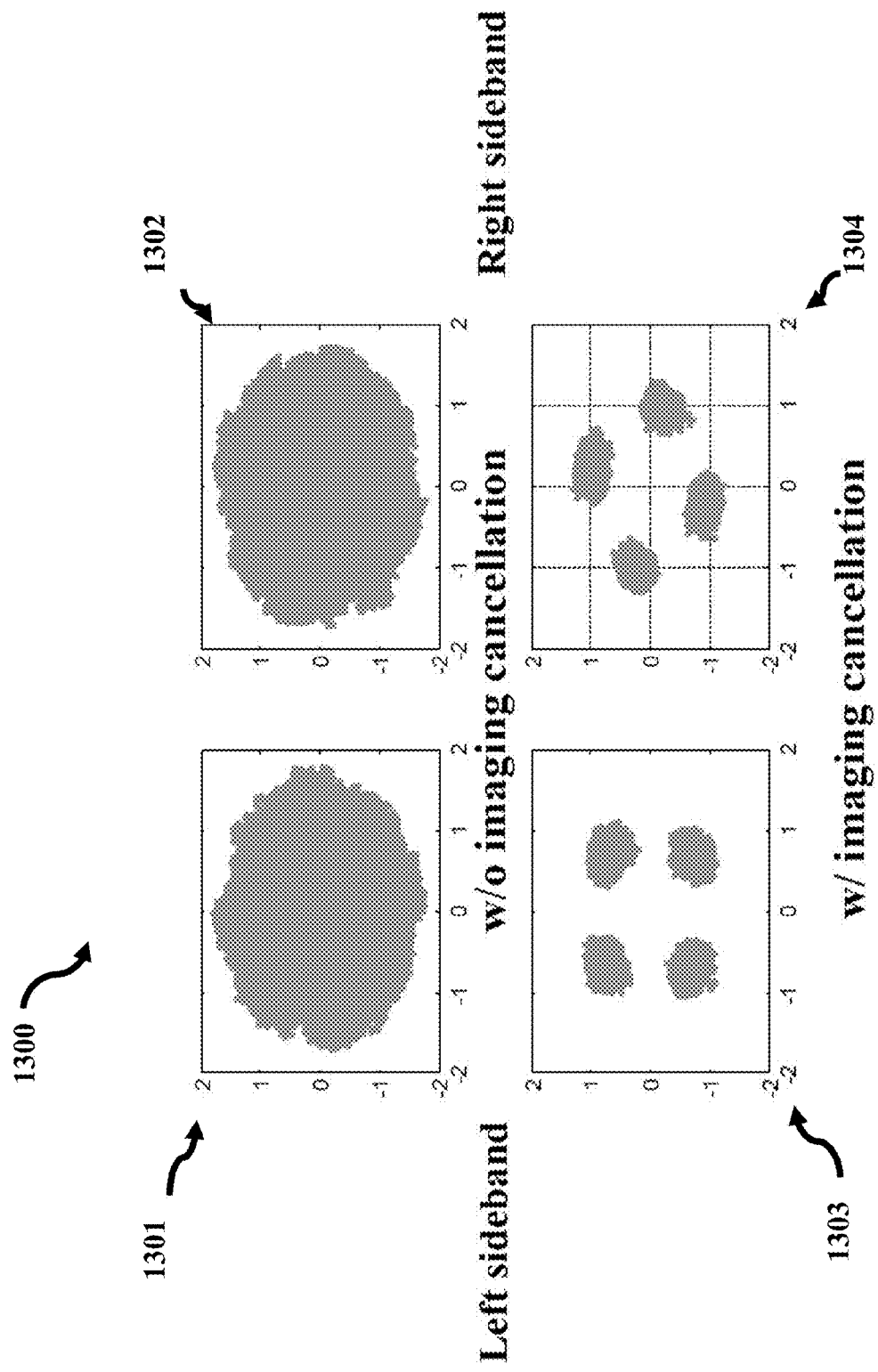
FIG. 13 shows a constellation diagram that illustrates outputs of a system with imaging cancellation and that of a system without imaging cancellation.

FIG. 13 illustrates example Experimental Results 1300 of an example of a constellation map from experimental results of a system using imaging cancellation and a system without imaging cancellation. The outputs of the left SSB 1301 and the right SSB 1302 of a system that does not use imaging cancellation suffer from noise which makes the identification of the data difficult. The outputs of the left SSB 1303 and the right SSB 1304 of a system that uses imaging cancellation does not suffer from as much noise and the data can be transmitted with less error. By removing imaging components, the efficiency of the system is improved. Four separate constellation points for each of the left SSB 1303 and right SSB 1304 are shown by example. Any number of constellation points can be utilized.

Figure 14:
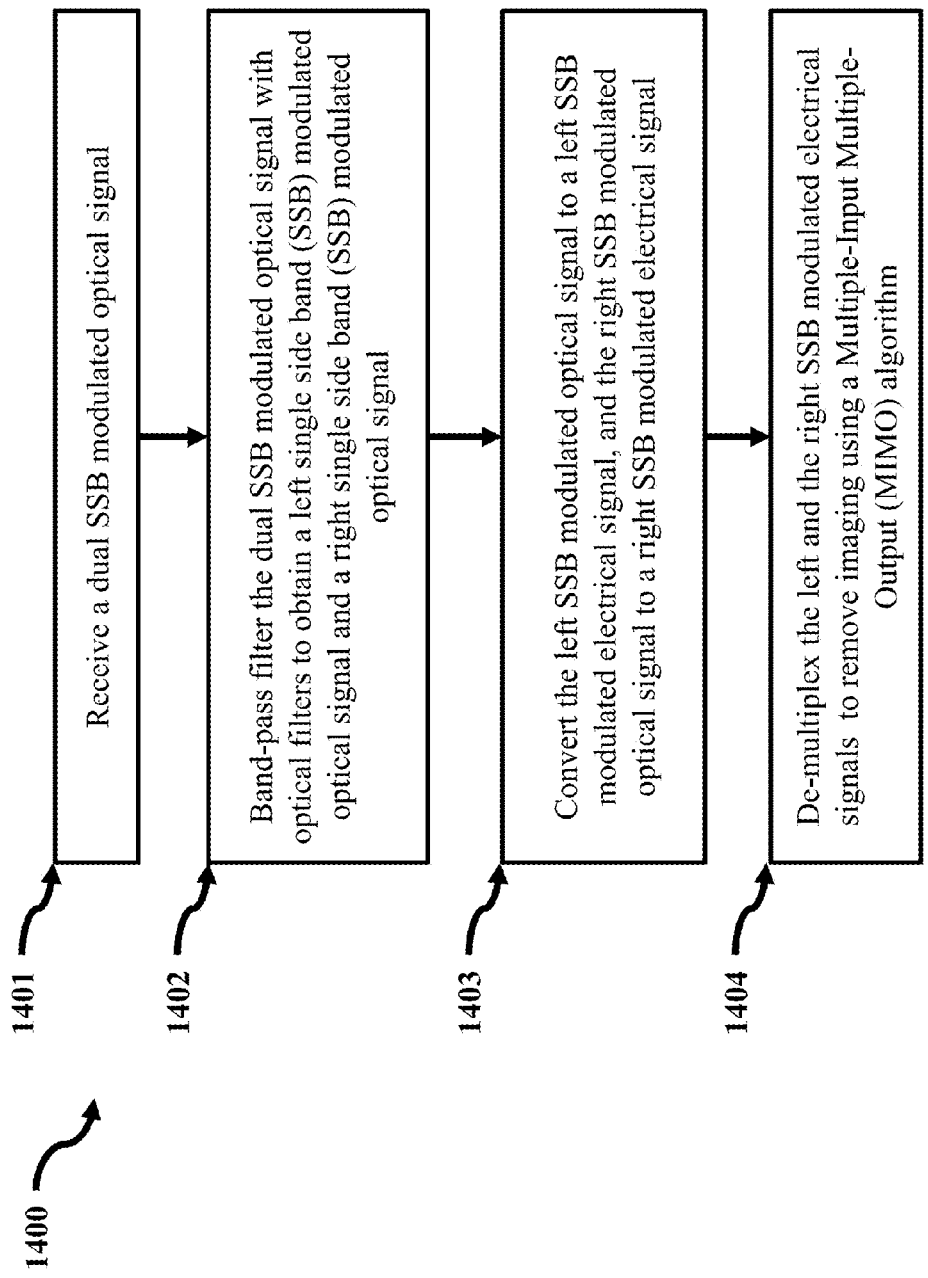
FIG. 14 shows an example flowchart that illustrates a method of optical communication.

FIG. 14 illustrates an example flowchart 1400 that illustrates the receipt and processing of optical signals on an optical system. A dual SSB modulated optical signal is received at 1401. The dual SSB signal can be generated by any optical system. In some embodiments, an optical laser can be used to generate an optical source and that source signal can be and modulated with any modulator known to generate dual SSB signals as shown in FIGS. 5-6. In some embodiments, the dual SSB signal includes two signal components: a left component and a right component, where the left component occupies approximately a left half of the frequency band, and has a left imaging component that occupies the remaining other half of the frequency band generally in the same spectral region as the right component, which has a corresponding right imaging component in the half of the spectrum occupied by the left component. In some embodiments, an IQ Modulator or DD-MZM Modulator can be utilized to generate dual SSB signals.

The data signals to the modulator used can be from any known processor, ASIC, or FPGA. The software or hardware can be used to modulate the dual SSB signal in any known modulation format. In some embodiments, the dual SSB modulated optical signal is modulated with DMT. In some embodiments, the dual SSB modulated optical signal is modulated with OFDM. In some embodiments, the dual SSB signal is modulated with WDM. In some embodiments, the dual SSB signal is modulated with carrier-less amplitude phase modulation (CAP). In some embodiments, the dual SSB signal is modulated with QAM.

The system then band-pass filters the dual SSB modulated optical signal with optical filters at 1402. The band-pass filters filter the left and right SSB modulated optical signals of the dual SSB modulated optical signal. In some embodiments, the optical signals can be converted to electrical signals prior to being filtered. In some embodiments, certain photodiodes as those shown in FIG. 10 can be utilized such as a positive-intrinsic negative photodiode or avalanche photodiode, for example, to receive optical signals and convert them to electrical signals. In some embodiments, as shown in 1403, the left SSB modulated optical signal can be converted to a left SSB modulated electrical signal, and the right SSB modulated optical signal can be converted to a right SSB modulated electrical signal. In some embodiments, after converting to the electrical domain, the electrical signals can be electrically filtered. In other embodiments, the electrical signals can be converted to digital signals and the digital signals can be filtered via software. In other embodiments, the optical signals are optically filtered and thereafter converted to the electrical domain. In other embodiments, the band-pass filters are optical filters and the filtered optical signals are thereafter converted to electrical signals.

After, being converted, the left and right SSB modulated electrical signals are de-multiplexed using a MIMO algorithm to remove imaging at 1404 that may have been present in the received dual SSB modulated signals in step 1401. In some embodiments, the MIMO algorithm can be performed in the time domain. In other embodiments, the MIMO algorithm can be performed in the frequency domain. The MIMO algorithm can be utilized to develop a channel matrix of the signal, whereby the imaging components of the left and right SSB can be eliminated. The MIMO algorithm can be performed in a digital signal processor, general purpose processor, ASIC, FPGA, or any similar or known circuit configuration. In some embodiments, the MIMO algorithm further comprises inserting time interleaved training sequences into channels of the right SSB modulated electrical signal and the left SSB modulated electrical signal of the dual SSB signal. In some embodiments, the removal of imaging utilizes constant-modulus-algorithm (CMA) de-multiplexing.

Figure 15:
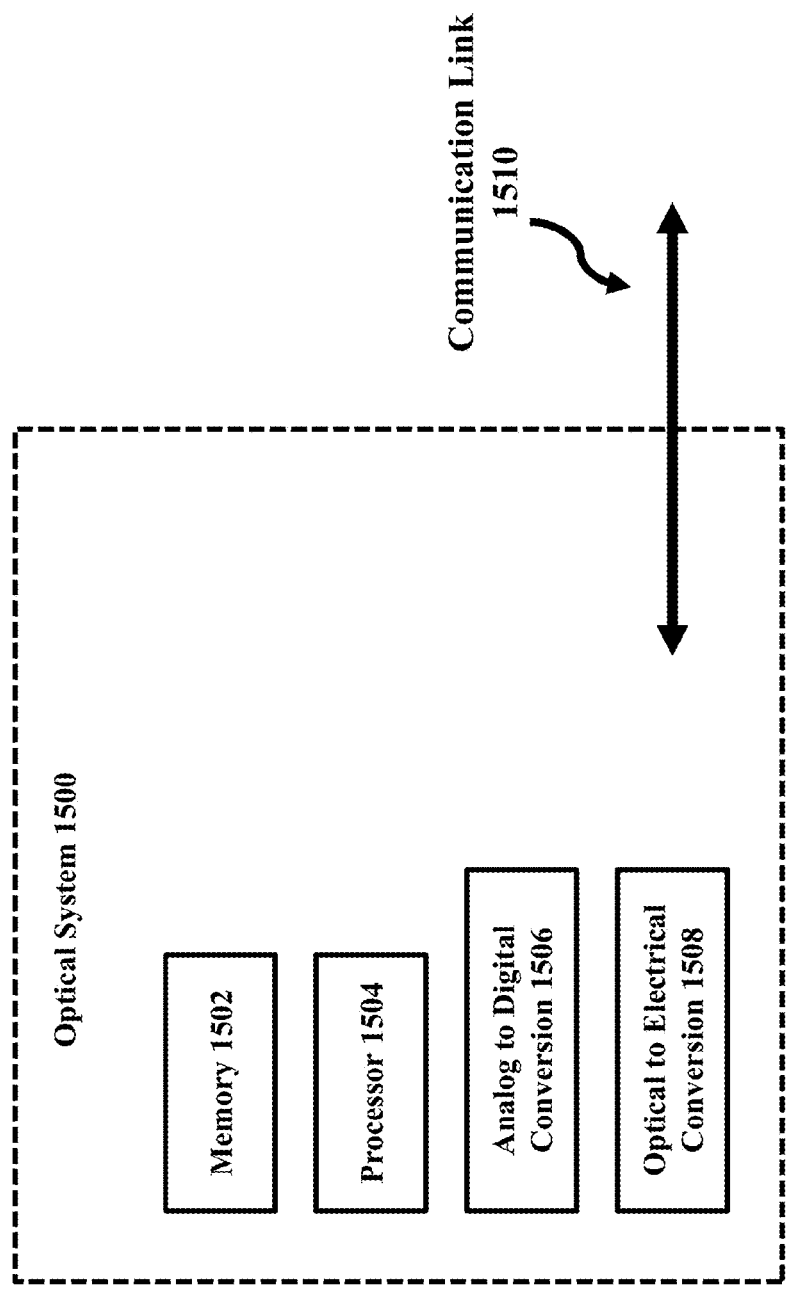
FIG. 15 shows a block diagram of an example of an optical communication system that can be used to receive and transmit information.

FIG. 15 is a block diagram of an example optical communication system 1500. The optical communication system 1500 includes a memory 1502, a processor, e.g., a digital signal processor, 1504, an analog to digital conversion section 1506 and an optical to electrical conversion section 1508, e.g., a photodiode that receives the modulated optical signal via a communication link 1510 and produces an electrical signal. In another embodiment, the optical to electrical conversion section 1508 contains a modulator to modulate optical signals and a laser diode source to generate optical signals. In another embodiment, although not shown, the optical system 1500 has filters such as optical band-pass or electrical band-pass filters. In another embodiment, although not shown, the optical system 1500 has amplifiers and signal conditioners. The optical communication system can be utilized to transmit or receive optical signals.

The memory 1502 stores instructions that, when executed, cause the processor 1504 to process the digital samples to generate estimates of transmitted bits. The instructions include instructions for performing resampling and synchronization of the digital samples and instructions for down converting data. In another embodiment, the memory 1502 also has instructions to perform Fourier transforms to recover QAM modulated signals, instructions for applying post-equalization to the QAM signals to generate equalized QAM signals, instructions to generate QAM signals, and instructions for generating and decoding QAM maps. The memory 1502 further comprises instructions to perform MIMO de-multiplexing or other modulating techniques described within.

Figure 16:
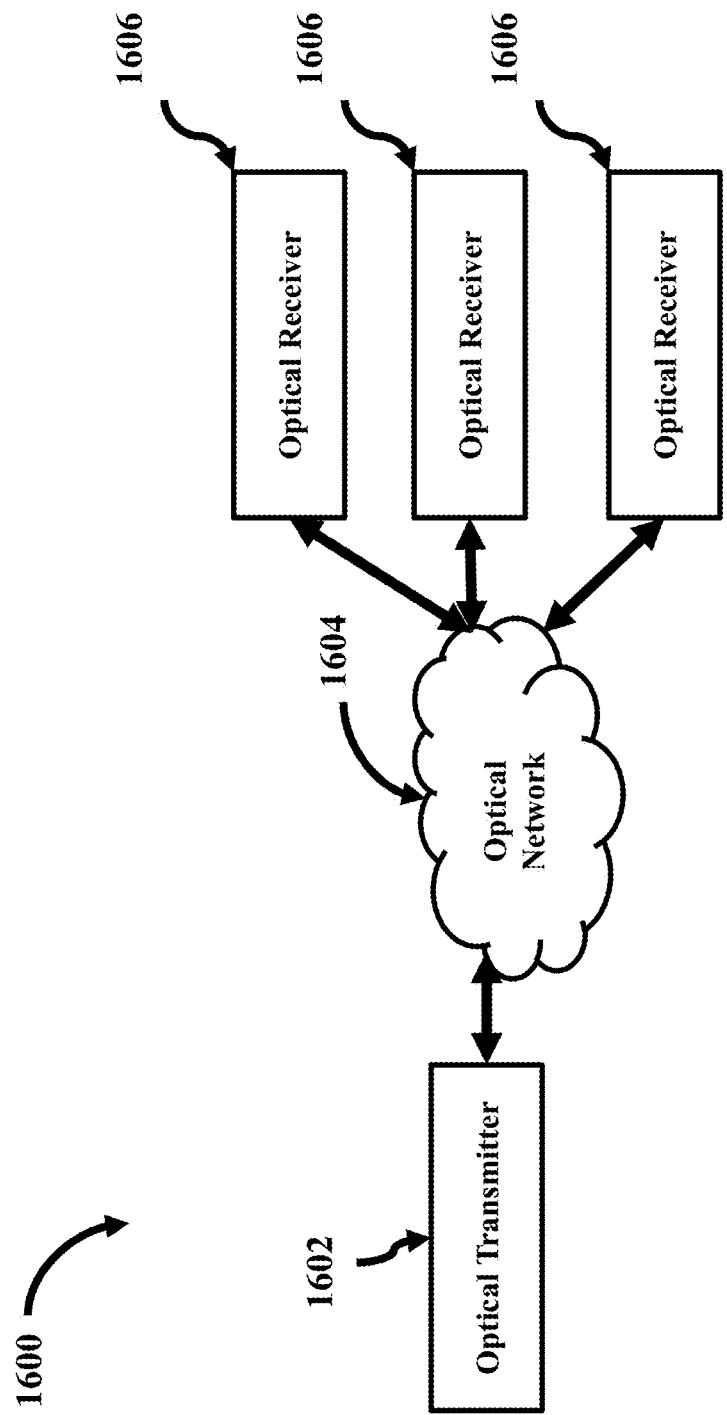
FIG. 16 illustrates an example representation of an example optical communication network.

FIG. 16 illustrates an example optical communication system 1600 in which the presently disclosed technology can be embodied. One or more optical transmitters 1602 are communicatively coupled via an optical network 1604 with one or more optical receivers 1606. The optical network 1604 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 16 for clarity. Various techniques disclosed in this document can be implemented by apparatus 1602, 1606 in the transmission network 1900. The optical communication system can be used with one or more optical transmitters and one or more optical receivers communicatively coupled via an optical network. The transmitted optical signals may go through intermediate optical equipment such as amplifiers, repeaters, switch, etc.

The optical systems discussed are only illustrative. Any optical system utilized can include a processor having a memory including software code for performing the techniques described herein, including code for performing Fourier transforms to recover and demodulate QAM modulated signals.

While the techniques are described specifically with reference to optical communication embodiments, it will be appreciated that the techniques can also be used for receiving signals transmitted over other physical mediums such as air, copper and coaxial cable.

It will be appreciated that techniques for receiving and processing two single side band modulated signals, e.g., I and Q components, whose images occupy frequency bands of the corresponding main signal components are disclosed. In some disclosed embodiments, MIMO signal reception techniques, e.g., formulating the signal recovery problem as a linear optimization using a channel matrix-like matrix, can be used. The matrix may be inverted using a well-known optimization technique.

It will further be appreciated that the disclosed techniques advantageously facilitate the use of high order intensity modulation to modulate and transmit data from a transmitter to a receiver, while the receiver is able to digitally process the received signal so as to extract each constellation (e.g., FIG. 13).

Optical Independent-Sideband Modulation for Bandwidth-Economic Coherent Transmission A bandwidth-economic coherent optical transmission technology using optical independent-sideband (O-ISB) modulation is proposed and implemented. Generation of two software-defined, 30-GBd O-ISB channels per wavelength sharing one set of transmitter hardware was demonstrated, which was made possible by digital single-sided up-conversion, channel pre-equalization and optical IQ modulation with precise amplitude and delay matching between driving signals. With 120-Gb/s PM-QPSK per O-ISB channel, 16 O-ISB channels was successfully delivered in 8 wavelengths at 3.86-bits/s/Hz over 2100 km SSMF. In addition, the system performance was evaluated by using regular and enhanced Rx DSP, respectively. For metro and regional network applications where small footprint, low power consumption and low cost are required features, the proposed two-channels-per-wavelength O-ISB modulation may be considered an economic option.

1. Introduction

Independent-sideband (ISB), an efficient modulation technique evolving from the double-sideband (DSB) and single-sideband (SSB) modulations, has been employed for bandwidth-economic radio communication systems for decades. Unlike DSB where one sideband is redundant, ISB makes use of the full bandwidth around a carrier by delivering independent data information over upper sideband (USB) and lower sideband (LSB). The same concept has later been adopted to build bandwidth-efficient fiber-optic links, which can be called either optical independent-sideband (O-ISB) or tandem single-sideband (T-SSB) modulation, and O-ISB channels were generated by using dual-arm optical modulators driven by image-reject LSB and USB analog signals, respectively. On the other hand, software-defined optics (SDO) is becoming a common language when it comes to next generation physical-layer optical transmission technologies. SDO allows new features and capabilities to be added to original systems without the painful hardware upgrade. The recent advent of high-speed digital-to-analog converters (DACs) has driven the implementation of SDO a huge step forward making a variety of new modulation formats now feasible for long-haul or metro applications. Recently, software-defined O-ISB channels generation was proposed, which not only simplifies the transmitter architecture by synthesizing LSB and USB signals in digital domain, but also maximizing the sideband energy by using optical IQ modulation with carrier suppression, and several software-definable O-ISB channels at 1.5 GBd were generated and evaluated in back to back. Unfortunately, the demonstrated symbol rate was insufficient to address the impact of 0-ISB on the emerging coherent 100 G or beyond-100 G transmission, and until now related researches haven't been reported and discussed yet.

Therefore, in this section discloses the first experimental study that was conducted on the bandwidth-economic beyond-100 G transmission by exploiting both O-ISB and SDO technologies. Such test bed was designed to have two 30-GBd O-ISB channels on a single wavelength, which is the highest software-defined O-ISB symbol rate reported to date. This enables the delivery of industrial per-wavelength 2×30-GBd solutions with two physical channels economically sharing one set of transmitter hardware. Using 8 wavelengths spaced at 62.5 GHz, 16 O-ISB channels were generated with each carrying 120-Gb/s polarization-multiplexed QPSK data at 3.86 bits/s/Hz. Below the soft-defined (SD) pre-FEC BER limit the aggregated channels were successfully transmitted over 2100-km SMF-28 with EDFA amplification.

In addition, technical issues such as digital pre-equalization to overcome the bandwidth constraint of DACs and the time-delay tolerance for O-ISB channel generation in terms of $Q^2$ factor as well as image-suppression ratio were also experimentally studied.

2. Optical Independent-Sideband (O-ISB) Channels Generation

Figure 17:
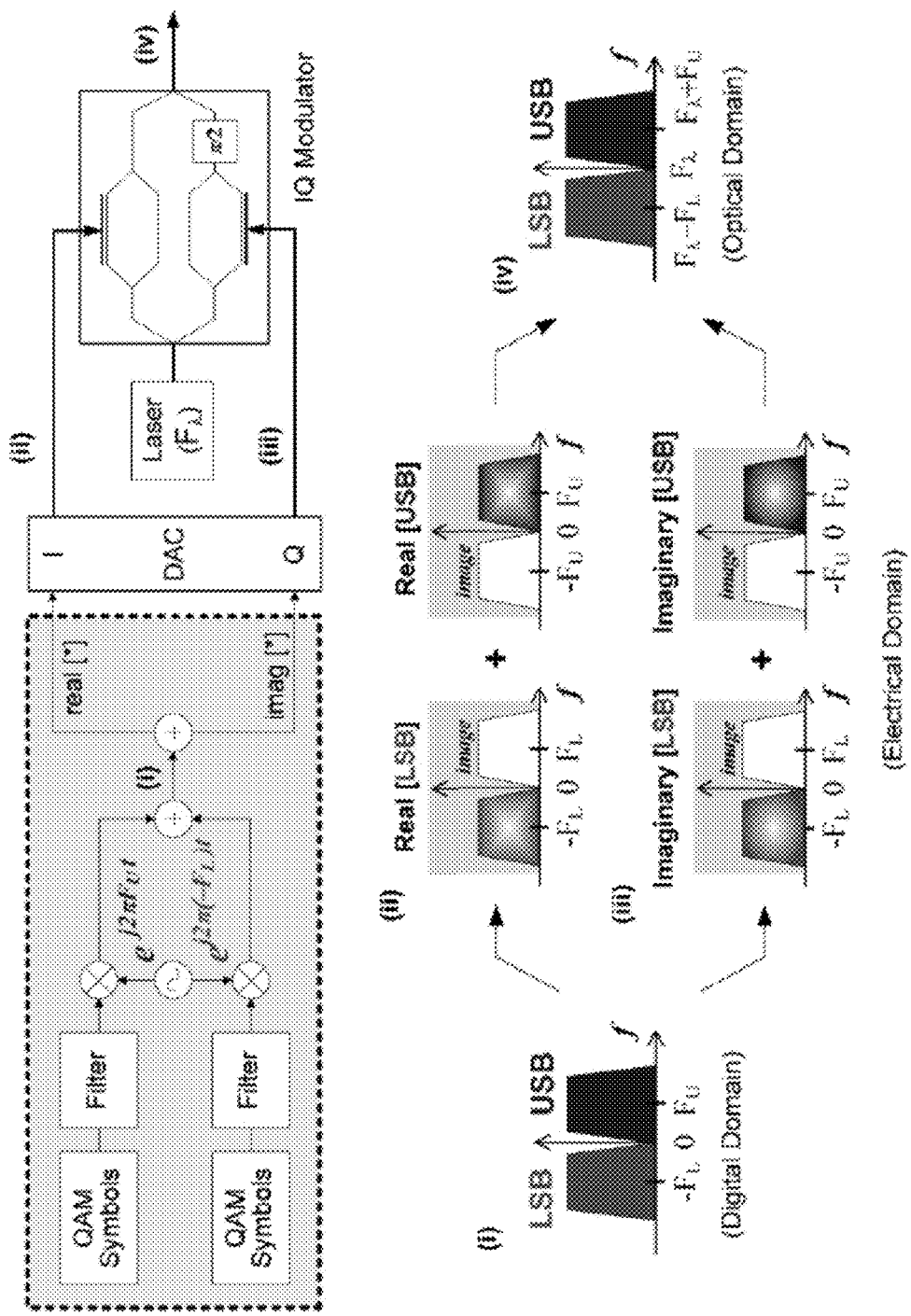
FIG. 17 illustrates schematic diagrams of optical independent-sideband (O-ISB) channels generation.
Figure 18:
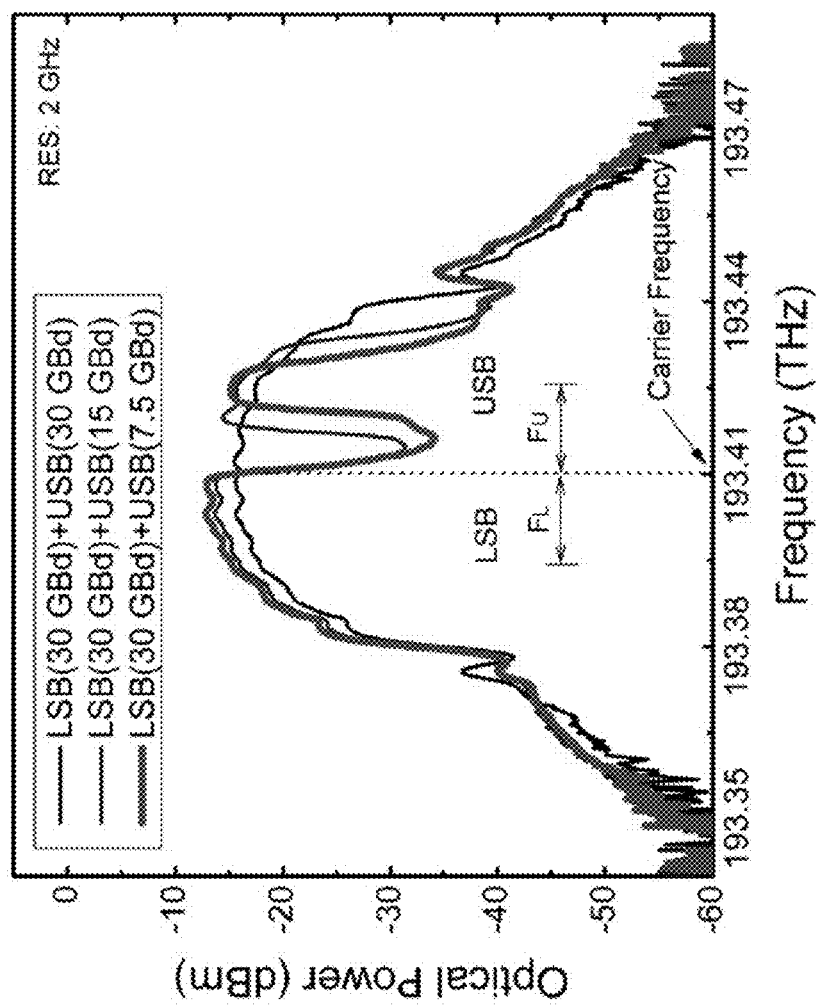
FIG. 18 illustrates the measured spectra of software-defined O-ISB channels with symbol rate up to 30 GBd per sideband

The generation of software-defined optical independent-sideband (O-ISB) channels has three different phases in the digital, electrical and optical domains, respectively. In order to distinguish between two independent sidebands, the one with lower frequency can be described as the lower sideband (LSB) and another is described as the upper sideband (USB). First of all, in the digital domain, two sets of baseband m-ary QAM symbols are shaped by digital filters to confine with signal bandwidth. The modulation format, symbol rate and roll-off factor could be different between two sidebands. Then they will modulate RF carriers in form of complex sinusoidal: $\exp[j2\pi(F_U)t]$ and $\exp[j2\pi(-F_L)t]$, for generating USB and LSB, respectively. $F_U$ and $-F_L$ represent positive and negative frequencies in Hz, respectively, and both $F_U$ and $F_L$ are positive numbers. The complex sinusoidal by nature has one-sided spectrum, as a result of a real sinusoidal with its positive or negative spectrum removed by Hilbert-transform phasing method, and is typically used for single-sideband modulation. As a result, combining the LSB and the USB digitally gives a full ISB signal as illustrated in inset (i) of FIG. 17. Next, converting the ISB signal to optical domain has two basic steps: IQ separation, and optical up-conversion with IQ combination. The former is done digitally by taking real and imaginary parts of the full ISB signal serving as the in-phase (I) and quadrature-phase (Q) inputs of a DAC. As illustrated in inset (ii) and (iii) of FIG. 17, the spectra at the DAC output can be viewed as the linear combination of LSB and USB spectra after taking their real or imaginary part. There will have undesired images between the real-valued LSB and USB signals. However, the latter step for signal up-conversion to an optical frequency $F_\lambda$ using an optical IQ modulator will inherently cancel out those images given by the reconstruction of a complex-valued LSB and USB as illustrated in inset (iv) of FIG. 17. Following the principle above, two O-ISB channels were generated, in which the symbol rate of the LSB was fixed 30 GBd while that of the USB varied from 7.5 to 30 GBd, and measured spectra are shown in FIG. 18 with 2-GHz resolution. As can be seen clearly in the curves of 7.5-GBd and 15-GBd USB, there are no undesired images of the 30-GBd LSB observed. Note that, this will require a fine match in power level and symbol delay between two tributaries at DAC output and will be discussed later.

3. WDM Transmission of 2×30-GBd O-ISB Channels Per Wavelength

FIG. 19D shows experimental setup for WDM transmission of software-defined 0-ISB channels. The transmitter consists of 8 external cavity lasers (ECLs) in odd and even groups. Each wavelength delivers one 30-GBd LSB and one 30-GBd USB with PM-QPSK modulation, and the wavelength spacing is 62.5 GHz. For the Tx DSP of the odd group, two sets of random bit sequences with a word length of 215 were generated and mapped to QPSK symbols, and filter with an approximated sinc impulse response implemented by zero-roll-off 256-tap root raised cosine (RRC) filtering was then applied at ×2 oversampling. After that the baseband data were up-converted to the desired $LSB_{odd}$ and USB$_{odd}$ bands at −15.2 GHz and +15.2 GHz, respectively, leaving 400-MHz guard band in between. Both LSB$_{odd}$ and USB$_{odd}$ digital samples were summed up and were fed into a 128-tap pre-equalization FIR filter before the subsequent IQ separation. The pre-equalization filter was used to compensate for the ISI impairment caused by those bandwidth-constraint components at both Tx and Rx, and its coefficients was designed in advance using time-domain training-based channel estimation. Same procedure and parameters were applied to the LSB$_{even}$ and the USB$_{even}$ at −15.2 GHz and +15.2 GHz, respectively. FIG. 19A shows the −3 dB two-sided bandwidth of the overall frequency response when connecting Tx and Rx in back to back is around 23.5 GHz for delivering two 30 GBd signals. FIG. 19B illustrates the combined RF spectrum of both LSB$_{odd}$ and USB$_{odd}$ with pre-equalization in the digital domain. The combined signal bandwidth is 60.2 GHz. The pre-equalization filter has a 10-dB cut-off threshold (corresponding to ±23.5 GHz) in order to balance the high-frequency gain and the signal-to-noise ratio. The pre-equalized signals were then re-sampled at a ratio of 1.067 to match the DAC's sampling rate at 64 GSa/s. The 500-mV DAC output were boosted by high-linear drivers with 30-GHz analog bandwidth, and then individually modulated odd ($\lambda_{1,3,5,7}$) and even wavelengths ($\lambda_{2,4,6,8}$) using 30-GHz optical IQ modulators, in which $\lambda_1$ is the shortest wavelength located at 1548.56 nm. The optical spectrum of one generated O-ISB signal carrying a pair of 30-GBd LSB and 30-GBd USB is shown in FIG. 18 (black curve). After the polarization multiplexers (P-Mux), both odd and even wavelengths were combined by using a polarization-maintained optical coupler (OC), and 1.92-Tb/s (16×120 Gb/s) aggregated WDM signal with 2×30-GBd O-ISB signal per wavelength and overall occupied bandwidth of 497.9 GHz was generated yielding a gross spectral efficiency (SE) of around 3.86 bits/s/Hz. Note that depending on the actual use case, the gross SE governed by the modulation levels is fully software-definable. FIG. 19C presents the optical spectra of the generated WDM O-ISB signals (0.02 nm resolution) with and without the USB channels. When only LSB presented, i.e., in the SSB condition, the measured image-suppression ratio was up to 21.16 dB, which can be described as the difference in optical power between the sideband and its undesired image on the opposite side of the optical carrier. The WDM signal was fed into a 420-km G.652 re-circulating loop with EDFA-only amplification. The averaged loss per span is 18 dB and a wavelength-selective switch (WSS) was configured to pass the whole O-ISB channels while reducing the excess ASE noise in the loop. The launched power is about 0 dBm per LSB/USB. At the coherent receiver, each sideband was selected one at a time by aligning the LO and sideband wavelengths and were processed offline using classical DSP algorithms with RRC match filtering. The results were also compared with those processed using enhanced algorithms: post filtering with maximum likelihood sequence estimation (MLSE) detection.

Figures 20A, 20B:
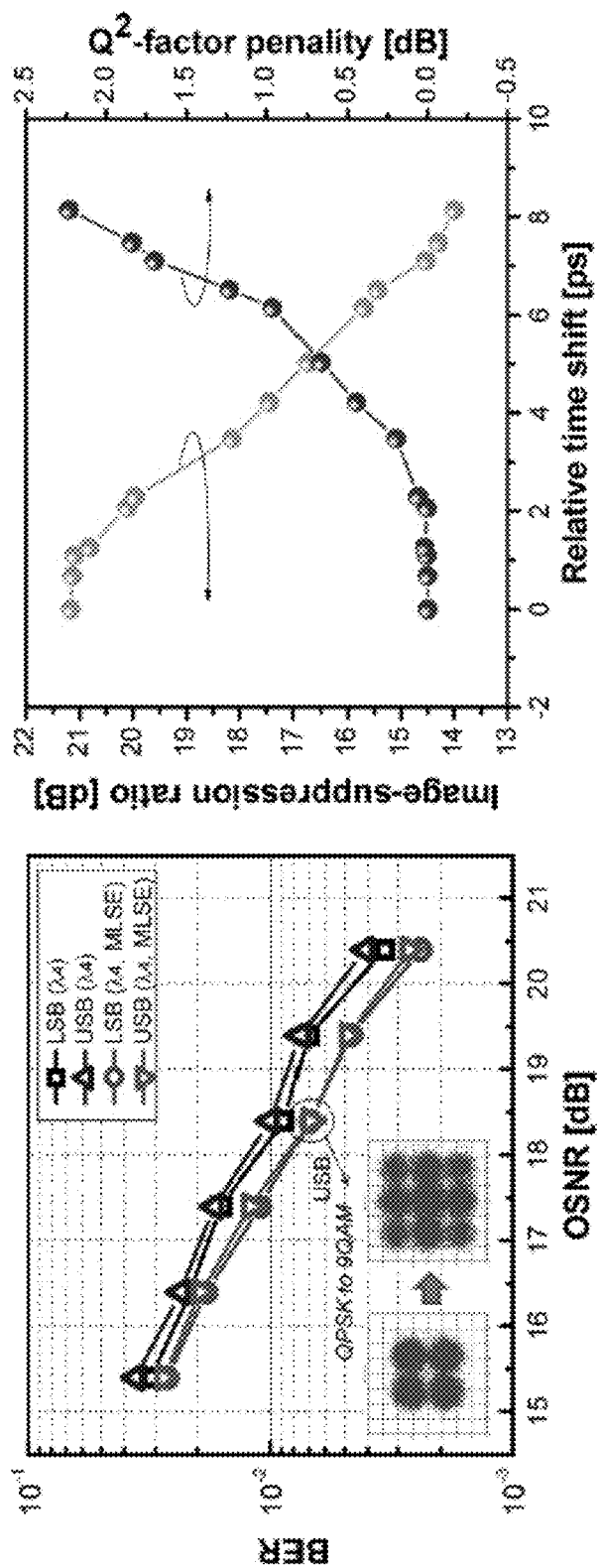
FIG. 20A shows the measured back-to-back (BTB) BER performance for the USB and LSB channels of wavelength $\lambda 4$ using regular and enhanced DSP, respectively
FIG. 20B illustrates, under the power-match condition, the $Q^2$ penalty and image-suppression ratio of the USB channel versus the relative time shift between two driving signals in BTB at 22-dB/0.1 nm OSNR.
Figure 21:
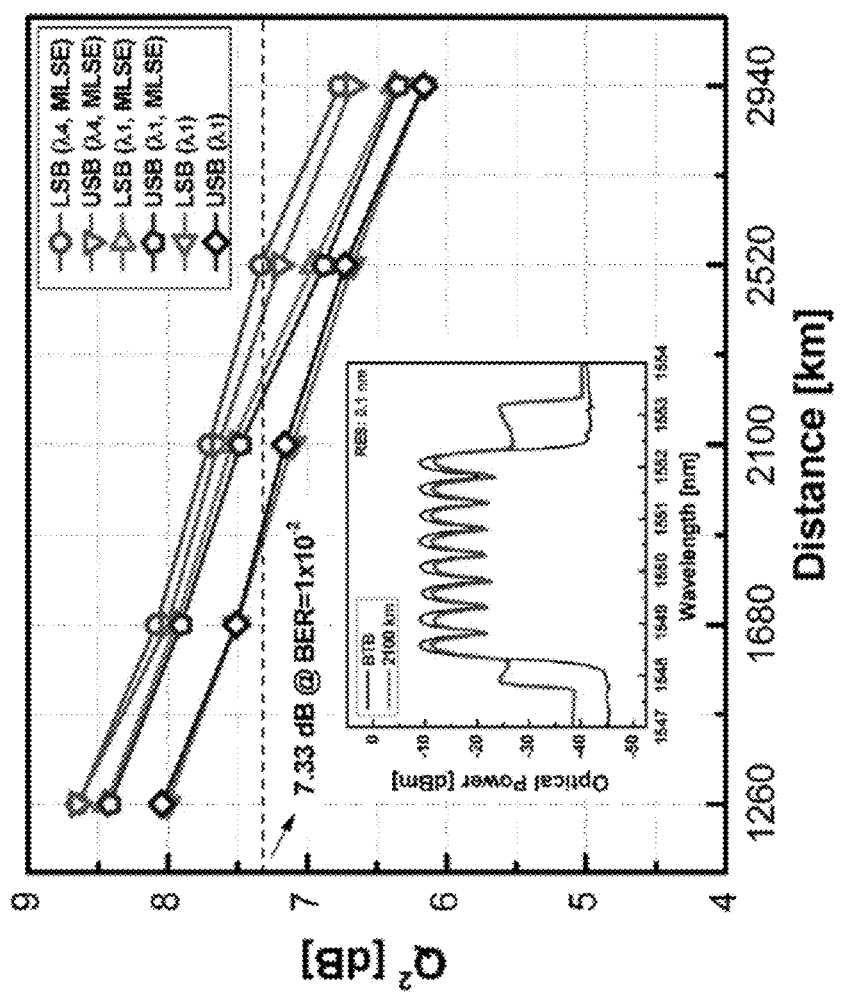
FIG. 21 shows the transmission curves of measured $Q^2$ factor versus transmission distance for LSB and USB at selected wavelengths $\lambda_1$ and $\lambda_4$, respectively.

FIG. 20A shows the measured back-to-back (BTB) BER performance for the USB and LSB channels of wavelength $\lambda_4$ using regular and enhanced DSP, respectively. The required OSNR at the soft-decision (SD) pre-FEC limit of 1×10−2 are 18.2 and 18.4 dB/0.1 nm for LSB and USB channels with regular DSP, which can be further reduced by 0.6 and 0.7 dB, respectively, with enhanced DSP. The 1-bit MLSE detector in cooperation of digital post filtering was studied to be beneficial for bandwidth-constraint signals. In addition, FIG. 20A depicts a transformation from a QPSK constellation to a 9QAM-like one before and after the digital post filtering in the DSP, respectively, for one USB at 18.4 dB/0.1 nm OSNR. In practice, the quality of O-ISB generation heavily depends on the power and delay matching between two driving signals of the optical IQ modulator. In FIG. 20B, under the power-match condition, the $Q^2$ penalty and image-suppression ratio of the USB channel versus the relative time shift between two driving signals in BTB at 22-dB/0.1 nm OSNR were studied. With regular DSP, the $Q^2$ penalty of USB was evaluated when both USB and LSB presented while the image-suppression ratio was measured when LSB was turned off. It was found 4.45-ps relative time shift was tolerable for $Q^2$ penalty of less than 0.5 dB, and at this point, the image suppression ratio was around 17.22 dB. For the transmission experiment, it was observed that, with MLSE detection, the LSB and USB at all wavelengths (1~8) can reach 2100 km with $Q^2$ factors higher than the SD pre-FEC limit of 7.33 dB (corresponding to 1×10−2 BER), and without MLSE detection, 1680 km can be achieved. FIG. 21 shows the transmission curves of measured $Q^2$ factor versus transmission distance for LSB and USB at selected wavelengths $\lambda_1$ and $\lambda_4$, respectively. In terms of performance, the edge wavelength $\lambda_1$ at 1548.56 nm was found to be the bench mark of all the wavelengths due to the slightly tilted noise level across the WDM spectrum, which is illustrated in the inset of FIG. 21, showing the received optical spectra both in BTB and after 2100 km transmission. The delivered OSNR after 2100 km is around 19.1 dB/0.1 nm for LSB and USB at $\lambda$1. As shown in FIG. 21, the MLSE-enabled $Q^2$ gain gradually decreases as the transmission distance increases. This is because accumulated noise dominates at lower OSNR, and MLSE designed for inter-symbol interference (ISI) mitigation was not able to further enhance the system performance under such condition.

4. Conclusion

This section suggests a software-defined, optical independent-sideband (O-ISB) modulation technique for bandwidth-economic coherent optical transmission. Digital generation of two 30-GBd O-ISB physical channels on a single wavelength was proposed and experimentally demonstrated. Its feasibility was further studied through a successful WDM transmission of sixteen PM-QPSK O-ISB channels in 8 wavelengths at 3.86 bits/s/Hz over 2100 km. In addition, digital pre-equalization for conquering the insufficient bandwidth of DAC and the tolerance of O-ISB generation subject to delay between driving signals of the optical IQ modulator were both investigated experimentally.

This section's research study is not meant to challenge existing optical transmission systems with one-channel-per-wavelength mechanism, which usually have sufficient modulation bandwidth and exhibit better performance at given modulation format and spectral efficiency, but rather to provide a complementary design strategy from the cost perspectives that doubles the supported channel count per wavelength, and optimizes these channels as much as possible in a shared hardware. It is believed that such two-channels-per-wavelength O-ISB scheme is favorable for systems demanding reduced footprint, less power consumption and lower cost, which are must-have features for metro and regional network applications.

Antenna Polarization Diversity for 146 Gb/s Polarization Multiplexing QPSK Wireless Signal Delivery at W-Band This section experimentally demonstrates a novel W-band integrated optical-wireless system based on antenna polarization diversity, which can realize 80-km SMF-28 transmission and 2-m 2×2 MIMO wireless delivery for up to 39-Gbaud (146 Gb/s) PDM-QPSK signal at W-band.

1. Introduction

High-speed integrated optical wireless system can be used to provide high-speed mobile backhaul between wireless macro stations as well as emergency services when largecapacity long-haul optical cables are cut during natural disasters such as earthquake and tsunami. In order to realize the high-speed optical wireless system, the wireless links need to be developed to match the capacity of high-speed fiber-optic communication systems, while preserving transparency to bit rates and modulation formats. Due to inherent wide bandwidth available at higher frequencies, W-band wireless transmission based on photonic mm-wave technique is expected to provide multi-gigabit wireless data transmission and has been intensively studied in the research community. Recently, an optical wireless system was demonstrated which realizes 80-km SMF-28 transmission and 1-m 2×2 MIMO wireless delivery for 108-Gb/s PDM-QPSK signal at 100 GHz. Here, the 2×2 MIMO wireless link, which adopts two pairs of horn antennas (HAs) at the same antenna polarization, can realize PDM signal delivery and effectively double the wireless transmission capacity. Further, a record 400 G optical wireless system was experimentally demonstrated by adopting two mm-wave frequency bands and two orthogonal antenna polarizations. Here, the 4×4 MIMO wireless link at each mm-wave frequency band, which simultaneously adopts two pairs of horizontal-polarization (H-polarization) HAs and two pairs of vertical-polarization (V-polarization) HAs, can realize two-channel PDM signal delivery and further double the wireless transmission capacity. However, the 4×4 MIMO wireless link based on antenna polarization multiplexing requires double antennas and devices and makes the system architecture more complicated. Moreover, severe wireless crosstalk may occur at the same antenna polarization for both the 2×2 and 4×4 MIMO wireless links and thus long-tap constant-modulus-algorithm (CMA) equalization is required at the receiver. It was experimentally demonstrated that the isolation can be over 33 dB between H- and V-polarization HAs. Thus, it is interesting to investigate the 2×2 MIMO wireless link simultaneously adopting one pair of H-polarization HAs and one pair of V-polarization HAs (which is denoted by antenna polarization diversity in the following part), for which, the PDM signal components delivered over different antenna polarizations can be effectively isolated. The optical wireless system adopting this kind of 2×2 MIMO wireless link may realize high-speed wireless PDM signal delivery with relatively simple system architecture and reduced CMA tap number.

2. Principle and Experimental Setup

FIGS. 22A and 22B show the schematic diagram of the 2×2 MIMO wireless links based on one single antenna polarization and antenna polarization diversity, respectively. The wireless PDM signal at mm-wave frequency band is first generated by an optical heterodyne up-converter. Then, the X- and Y-polarization components of the wireless PDM signal are independently broadcasted by two transmitter HAs into the air, and simultaneously received by two receiver HAs. Note that the X- or Y-polarization component after the optical heterodyne up-converter in FIGS. 22A and 22B do not mean that only X- or Y-polarization transmission signal exists at each output port of the optical heterodyne up-converter. In fact, each output port contains both X- and Y-polarization transmission signals. In this section, one output port of the optical heterodyne up-converter can be described as X-polarization component and the other as Y-polarization for simplification. The received wireless power from one transmitter HA should be equal to that from the other transmitter HA, and otherwise the transmitted data cannot be effectively recovered from the received wireless signal at the wireless receiver. It is because the unequal wireless power from two transmitter HAs will cause the amplitude imbalance of the X- and Y-polarization components of the received wireless signal. When the amplitude imbalance is severe, the receiver-based DSP procedure will become ineffective and the system performance will be degraded. In order to receive the same wireless power from two transmitter HAs, the position and direction of each receiver HA should be properly adjusted. For the 2×2 MIMO wireless link shown in FIG. 22A, each receiver HA can simultaneously receive the wireless power from two transmitter HAs and wireless crosstalk may occur. Moreover, the wireless crosstalk can become more severe with the increase of wireless transmission distance, which makes the proper adjustment of two receiver HAs difficult for long-haul wireless transmission. For the 2×2 MIMO wireless link shown in FIG. 22B, however, the pair of H-polarization HAs is well isolated from the pair of V-polarization HAs and the receiver HA at one antenna polarization can only detect the wireless signal from the transmitter HA at the same antenna polarization. Thus, wireless crosstalk between the two pairs of HAs can be effectively avoided, which makes the HA adjustment much easier. For the PDM signal, both fiber transmission and 2×2 MIMO wireless delivery can be considered based on a 2×2 MIMO model and denoted by a 2×2 Jones matrix. The multiplication of two 2×2 Jones matrixes is still a 2×2 matrix. Thus, the classic CMA equalization can be used at the wireless receiver to simultaneously implement polarization de-multiplexing and wireless crosstalk suppression. When two pairs of HAs have a high directionality in the 2×2 MIMO link, X- and Y-polarization transmission links are parallel and each receiver HA can only get the wireless power from corresponding transmitter HA. Thus, no wireless crosstalk can occur and similar CMA taps are required whether the 2×2 MIMO wireless link is based on one single antenna polarization or antenna polarization diversity. However, when X- and Y-polarization transmission links are cross in the 2×2 MIMO link, each receiver HA can get the wireless power from two transmitter HAs if one single antenna polarization is adopted. Thus, wireless crosstalk occurs and longer-tap CMA equalization is required. However, if antenna polarization diversity is adopted, the receiver HA at one antenna polarization can only detect the wireless signal from the transmitter HA at the same antenna polarization, and wireless crosstalk can be effectively avoided. Thus, in the cross-over case, the adoption of antenna polarization diversity can reduce the required CMA tap number.

Figures 23A, 23B, 23C, 23D:
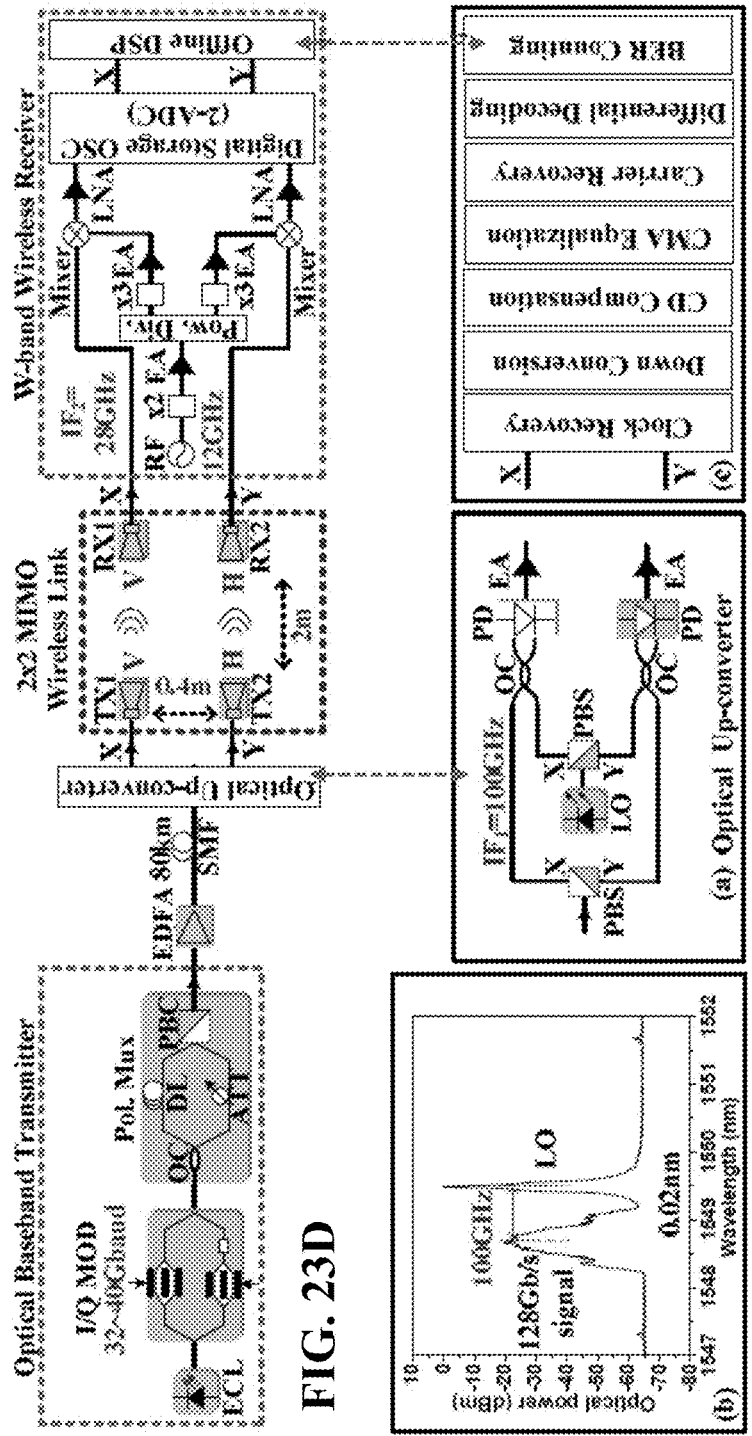
FIG. 23A illustrates an experimental setup of an optical up-converter.
FIG. 23B illustrates an optical spectrum at 128-Gb/s bit rate after polarization-diversity splitting.
FIG. 23C illustrates a DSP for W-band optical wireless system.
FIG. 23D shows the experimental setup for W-band optical wireless system adopting antenna polarization diversity.

FIG. 23D shows the experimental setup for W-band optical wireless system adopting antenna polarization diversity. At the optical baseband transmitter, one ECL at 1558.51 nm has linewidth less than 100 kHz and maximum output power of 14.5 dBm. The CW lightwave from ECL is first modulated by a 32~40-Gbaud electrical binary signal with the aid of I/Q modulator, and then polarization multiplexed by polarization multiplexer. The electrical binary signal has a PRBS length of $2^{15}-1$ and is generated from pulse pattern generator (PPG). The generated optical PDM-QPSK signal is then launched into 80-km SMF-28, which has 18-dB fiber loss and 17-ps/km/nm CD at 1550 nm without optical dispersion compensation. The EDFA is used to compensate for the fiber loss. The launched power into fiber (after EDFA) is 4 dBm. At the optical up-converter shown in FIG. 23A, an ECL at 1557.71 nm, with linewidth less than 100 kHz, is used as LO and has 100-GHz frequency offset relative to the received signal. Two polarization beam splitters (PDs) and two OCs are used to implement polarization diversity of the received signal and LO in optical domain before heterodyne beating. FIG. 23B shows the optical spectrum at 128-Gb/s bit rate after polarization-diversity splitting. The frequency spacing and power difference between the signal and LO is 100 GHz and 20 dB, respectively. Two 100-GHz photo detectors (PDs), each with 90-GHz 3-dB bandwidth and 7.2-dBm input power, directly up-convert the X- and Y-polarization components of the optical PDM-QPSK signal into 100 GHz, respectively. The X- and Y-polarization 100-GHz components independently pass through two 100-GHz narrowband electrical amplifiers (EAs) with 32-dB gain and 10-dBm saturation output power, and then, are simultaneously sent into a 2×2 MIMO wireless link based on antenna polarization diversity. The isolation between H- and V-polarization HAs is 33 dB, and thus the wireless crosstalk between X- and Y-polarization signals can be ignored. Each pair of HAs have a 2-m wireless distance, the X- and Y-polarization wireless links are parallel and two transmitter (receiver) HAs have a 0.4-m wireless distance. Each HA has a 25-dBi gain. Analog down conversion is first implemented at the wireless receiver. A 12-GHz sinusoidal RF signal firstly passes through an active frequency doubler (×2) and an EA in serial, and is then halved into two branches by a power divider. Next, each branch passes through a passive frequency tripler (×3) and an EA in serial. As a result of this cascaded frequency doubling, an equivalent 72-GHz RF signal is provided for each balanced mixer. Thus, the X- and Y-polarization components centered on 28 GHz are obtained after analog down conversion. Each band-pass low-noise amplifier (LNA) after the mixer is centered on 100 GHz and has a 5-dB noise figure. The analog-to-digital conversion is realized in the real-time oscilloscope with 160-GSa/s sampling rate and 65-GHz electrical bandwidth. The DSP shown in FIG. 23C includes clock recovery, down conversion, CD compensation, CMA equalization, carrier recovery, differential decoding and BER counting. For CMA equalization, two complex-valued, 19-tap, T/2-spaced adaptive FIR filters, based on the classic CMA, is used to implement polarization de-multiplexing.

Figure 24:
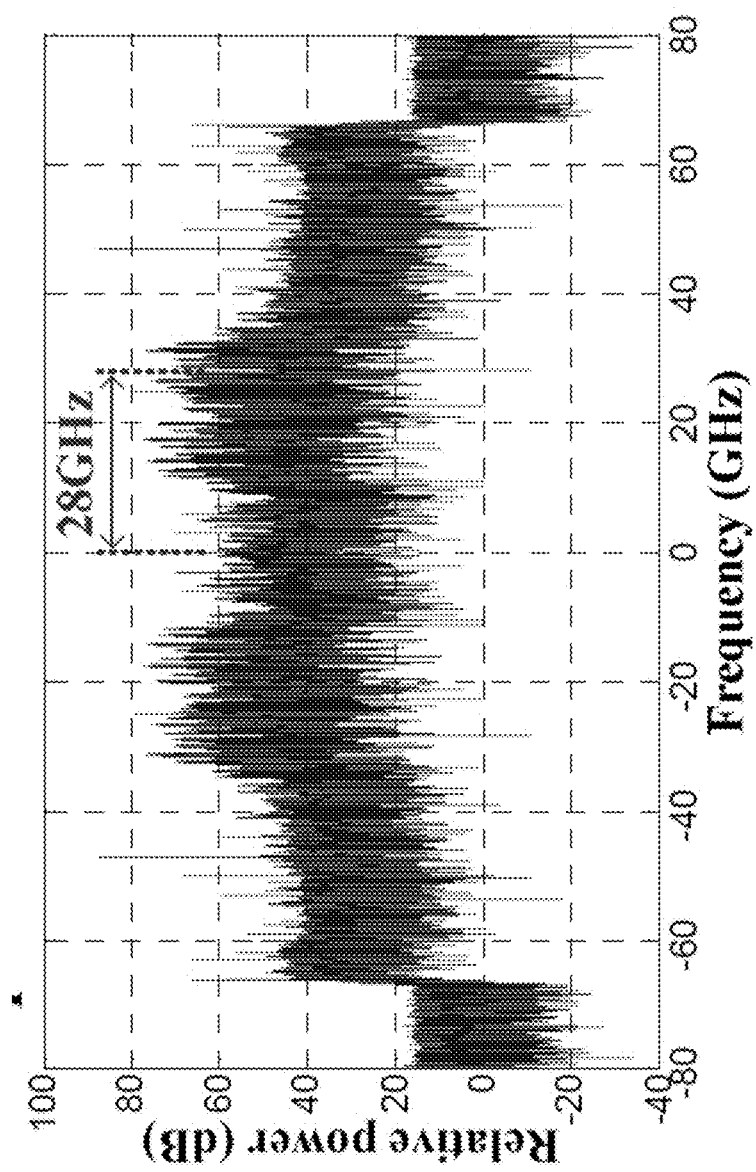
FIG. 24 shows electrical spectrum centered at 28-GHz IF after analog down conversion.
Figures 25A, 25B:
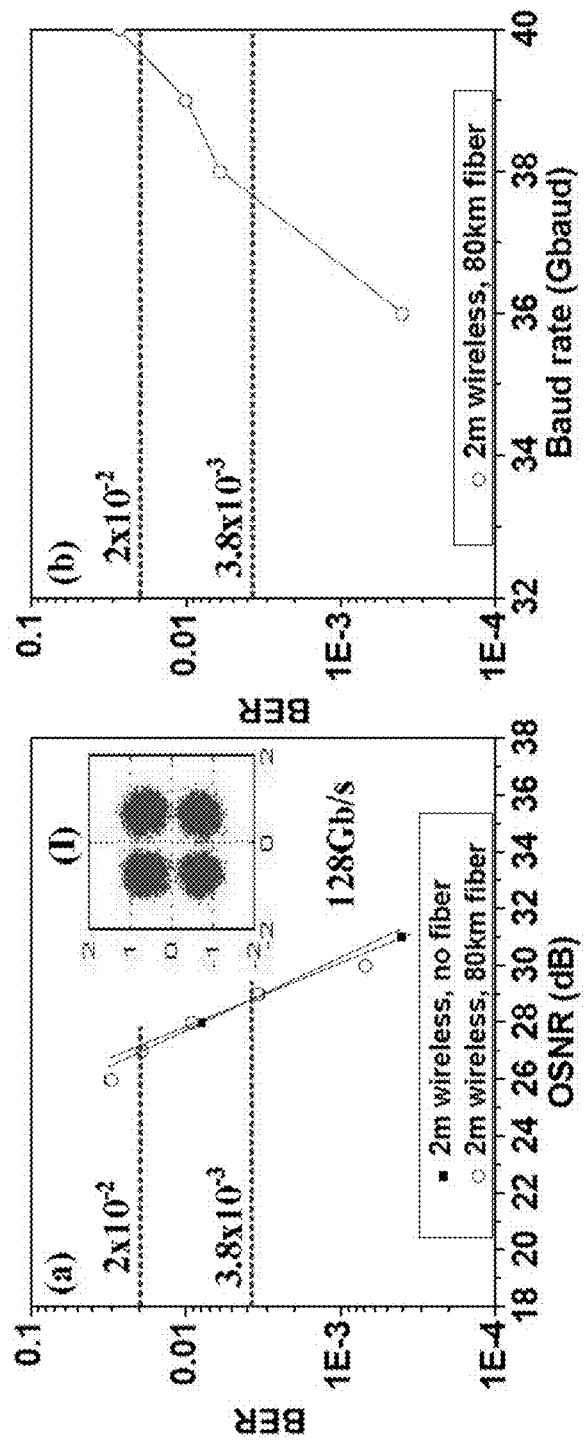
FIG. 25A shows BER versus OSNR for the 128-Gb/s signal after 2-m wireless delivery.
FIG. 25B shows BER versus baud rate after 2-m wireless delivery and 80-km SMF-28 transmission.

FIG. 24 shows electrical spectrum centered at 28-GHz IF after analog down conversion. FIG. 25A shows BER versus OSNR for the 128-Gb/s signal after 2-m wireless delivery. The net bit rate is 100 Gb/s after removing 28% FEC and Ethernet overheads. The launched power into fiber is 4 dBm. 80-km SMF-28 transmission almost causes no OSNR penalty. The BER of $2 \times 10^{-2}$ can be attained at the OSNR of 27 dB, while the BER of $3.8 \times 10^{-3}$ can be attained at the OSNR of 29 dB. Inset (I) show Y-polarization QPSK constellations after 2-m wireless delivery and 80-km SMF-28 transmission at the BER of $2.6 \times 10^{-4}$. FIG. 25B shows BER versus baud rate after 2-m wireless delivery and 80-km SMF-28 transmission. A BER below $3.8 \times 10^{-3}$ at 36-Gbaud baud rate and a BER below $2 \times 10^{-2}$ at 39-Gbaud baud rate can be achieved. The 39-Gbaud baud rate is corresponding to a net bit rate of 121 Gb/s after removing 20% FEC overhead, which is the highest bit rate per channel demonstrated for the wireless signal delivery so far.

4. Conclusion

This section experimentally demonstrates a novel W-band optical wireless system based on antenna polarization diversity, which can realize 80-km SMF-28 transmission and 2-m 2×2 MIMO wireless delivery for up to 39-Gbaud PDM-QPSK signal at 100 GHz. Antenna polarization diversity can not only make the HA adjustment easier but also reduce the required CMA tap number. After removing 20% FEC overhead, the 39-Gbaud baud rate is corresponding to a net bit rate of 121 Gb/s, which is the highest bit rate per channel demonstrated for the wireless signal delivery so far.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method, implemented at a receiver in an optical network, comprising:
   receiving a dual single side band (SSB) modulated optical signal on a transmission fiber, wherein the dual SSB modulated optical signal includes a left SSB modulated optical signal and a right SSB modulated optical signal;
   band-pass filtering the dual SSB modulated optical signal with optical filters to obtain a left single side band (SSB) modulated optical signal and a right single side band (SSB) modulated optical signal;
   converting the left SSB modulated optical signal to a left SSB modulated electrical signal, and the right SSB modulated optical signal to a right SSB modulated electrical signal; and
   de-multiplexing the left and the right SSB modulated electrical signals to remove imaging using a Multiple-Input Multiple-Output (MIMO) algorithm, wherein the MIMO algorithm further comprises inserting time interleaved training sequences into channels of the right SSB modulated electrical signal and the left SSB modulated electrical signal.

2. The method of claim 1, wherein the de-multiplexing is performed in a time domain.

3. The method of claim 1, further comprising:
   digitizing, resampling, and down-converting the left and the right SSB modulated electrical signal.

4. The method of claim 1, further comprising electrically amplifying the left and the right SSB modulated electrical signal.

5. The method of claim 1, wherein the dual SSB modulated optical signal is modulated with orthogonal frequency division multiplexing (OFDM).

6. The method of claim 1, wherein the dual SSB modulated optical signal is modulated with discrete multi-tone modulation (DMT).

7. The method of claim 1, wherein the dual SSB modulated optical signal is modulated with a single carrier modulation format and the MIMO algorithm further comprises constant-modulus-algorithm (CMA) de-multiplexing.

8. The method of claim 1, wherein the dual SSB modulated optical signal is modulated with a Dual Drive Mach-Zehnder Modulator.

9. The method of claim 1, wherein the dual SSB modulated optical signal is transmitted using wavelength-division multiplexing (WDM).

10. The method of claim 1, wherein the dual SSB modulated optical signal is modulated with carrier-less amplitude phase modulation (CAP).

11. The method of claim 1, wherein the dual SSB modulated optical signal is modulated with quadrature amplitude modulation (QAM).

12. A receiver in an optical network, comprising:
    a first optical band-pass filter and a second optical band-pass filter configured to receive a dual single side band (SSB) modulated optical signal on a transmission fiber, wherein:
       the dual SSB modulated optical signal includes a left SSB modulated optical signal and a right SSB modulated optical signal,
       the first optical band-pass filter configured to band-pass filter the dual SSB optical signal to obtain the left SSB modulated optical signal, and
       the second optical band-pass filter configured to band-pass filter the dual SSB optical signal to obtain the right SSB modulated optical signal;
    a first photodiode configured to convert the left SSB modulated optical signal to a left SSB modulated electrical signal;
    a second photodiode configured to convert the right SSB modulated optical signal to a right SSB modulated electrical signal; and
    a processor configured to de-multiplex the left and the right SSB modulated electrical signal to remove imaging using a Multiple-Input Multiple-Output (MIMO) algorithm, wherein the MIMO algorithm further comprises inserting time interleaved training sequences into channels of the right SSB modulated electrical signal and the left SSB modulated electrical signal.

13. The receiver of claim 12, wherein the processor is also configured to de-multiplex in a time domain.

14. The receiver of claim 12, further comprising:
    a first analog-to-digital converter configured to convert the left SSB modulated electrical signal into a left SSB modulated digital signal;
    a second analog-to-digital converter configured to convert the right SSB modulated electrical signal into a right SSB modulated digital signal; and
    the processor further configured to resample and down-convert the left and right SSB modulated digital signal.

15. The receiver of claim 12, further comprising:
    a first amplifier configured to amplify the left SSB modulated electrical signal; and
    a second amplifier configured to amplify the right SSB modulated electrical signal.

16. The receiver of claim 12, wherein the dual SSB modulated optical signal is modulated with orthogonal frequency division multiplexing (OFDM).

17. The receiver of claim 12, wherein the dual SSB modulated optical signal is modulated with discrete multi-tone modulation (DMT).

18. The receiver of claim 12, wherein the dual SSB modulated optical signal is modulated with a single carrier modulation format and the MIMO algorithm further comprises constant-modulus-algorithm (CMA) de-multiplexing.

19. The receiver of claim 12, wherein the dual SSB modulated optical signal is modulated with a Dual Drive Mach-Zehnder Modulator.

20. The receiver of claim 12, wherein the dual SSB modulated optical signal is transmitted using wavelength-division multiplexing (WDM).

21. The receiver of claim 12, wherein the dual SSB modulated optical signal is modulated with carrier-less amplitude phase modulation (CAP).

22. The receiver of claim 12, wherein the dual SSB modulated optical signal is modulated with quadrature amplitude modulation (QAM).

* * * * *